(12) United States Patent
Starkie

(10) Patent No.: US 8,296,129 B2
(45) Date of Patent: Oct. 23, 2012

(54) SYSTEM AND PROCESS FOR GRAMMATICAL INFERENCE

(75) Inventor: Bradford Craig Starkie, Surrey Hills (AU)

(73) Assignee: Telstra Corporation Limited, Melbourne, Victoria (AU)

( * ) Notice: Subject to any disclaimer, the term of this patent is extended or adjusted under 35 U.S.C. 154(b) by 1285 days.

(21) Appl. No.: 10/554,861

(22) PCT Filed: Apr. 29, 2004

(86) PCT No.: PCT/AU2004/000547
§ 371 (c)(1),
(2), (4) Date: Dec. 6, 2007

(87) PCT Pub. No.: WO2004/097663
PCT Pub. Date: Nov. 11, 2004

(65) Prior Publication Data
US 2008/0126078 A1    May 29, 2008

(30) Foreign Application Priority Data
Apr. 29, 2003   (AU) ................. 2003902020

(51) Int. Cl.
*G06F 17/27* (2006.01)

(52) U.S. Cl. ............ 704/9; 704/1; 704/10; 704/251; 704/257

(58) Field of Classification Search ............ 704/1, 9, 704/10, 251, 257
See application file for complete search history.

(56) References Cited

U.S. PATENT DOCUMENTS

| | | | |
|---|---|---|---|
| 5,241,619 A | 8/1993 | Schwartz et al. | |
| 5,452,397 A | 9/1995 | Ittycheriah et al. | |
| 5,642,519 A | 6/1997 | Martin | |
| 5,737,723 A | 4/1998 | Riley et al. | |
| 5,860,063 A | 1/1999 | Gorin et al. | |
| 5,937,385 A | 8/1999 | Zadrozny et al. | |
| 5,995,918 A * | 11/1999 | Kendall et al. | 704/1 |
| 6,016,470 A | 1/2000 | Shu | |
| 6,023,760 A * | 2/2000 | Karttunen | 712/300 |
| 6,044,347 A | 3/2000 | Abella et al. | |
| 6,144,938 A | 11/2000 | Surace et al. | |
| 6,154,722 A | 11/2000 | Bellegarda | |
| 6,173,261 B1 | 1/2001 | Arai et al. | |

(Continued)

FOREIGN PATENT DOCUMENTS

EP    0 312 209 B1    11/1992

(Continued)

OTHER PUBLICATIONS

Van Zaanen, Bootstrapping Structure into Language: Alignment-Based Learning, Arxiv prepring cs/0205025, 2002, pp. 1-128.*

(Continued)

*Primary Examiner* — David R Hudspeth
*Assistant Examiner* — Lamont Spooner
(74) *Attorney, Agent, or Firm* — Nixon Peabody LLP

(57) ABSTRACT

A grammatical inference system for inferring a grammar from a plurality of example sentences. The system selects sentences having a common suffix or prefix component; identifies the other of said suffix or prefix component of each selected sentence; generating rules for generating the example sentences and the other components; reduces the right hand side of each rule on the basis of the right hand sides of the other rules; and generates a grammar on the basis of the reduced rules.

23 Claims, 9 Drawing Sheets

U.S. PATENT DOCUMENTS

| | | | |
|---|---|---|---|
| 6,182,039 B1* | 1/2001 | Rigazio et al. | 704/257 |
| 6,188,977 B1* | 2/2001 | Hirota | 704/9 |
| 6,269,336 B1 | 7/2001 | Ladd et al. | |
| 6,314,402 B1 | 11/2001 | Monaco et al. | |
| 6,321,198 B1 | 11/2001 | Hank et al. | |
| 6,332,118 B1* | 12/2001 | Yamabana | 704/9 |
| 6,411,952 B1 | 6/2002 | Bharat et al. | |
| 6,434,521 B1 | 8/2002 | Barnard | |
| 6,449,589 B1* | 9/2002 | Moore | 704/9 |
| 6,456,971 B1* | 9/2002 | Mohri et al. | 704/256.4 |
| 6,493,673 B1 | 12/2002 | Ladd et al. | |
| 6,510,411 B1 | 1/2003 | Norton et al. | |
| 6,523,016 B1 | 2/2003 | Michalski | |
| 6,574,597 B1* | 6/2003 | Mohri et al. | 704/251 |
| 6,587,822 B2 | 7/2003 | Brown et al. | |
| 6,604,075 B1 | 8/2003 | Brown et al. | |
| 6,618,697 B1 | 9/2003 | Kantrowitz et al. | |
| 6,684,183 B1 | 1/2004 | Korall et al. | |
| 6,836,760 B1* | 12/2004 | Bellegarda et al. | 704/257 |
| 6,983,239 B1* | 1/2006 | Epstein | 704/9 |
| 7,031,908 B1* | 4/2006 | Huang et al. | 704/9 |
| 7,080,004 B2* | 7/2006 | Wang et al. | 704/9 |
| 7,143,027 B2* | 11/2006 | Moore | 704/9 |
| 7,289,948 B1* | 10/2007 | Mohri | 704/9 |
| 2001/0013001 A1 | 8/2001 | Brown et al. | |
| 2001/0016074 A1 | 8/2001 | Hamamura | |
| 2002/0087325 A1 | 7/2002 | Lee et al. | |
| 2002/0188454 A1 | 12/2002 | Sauber | |
| 2003/0007609 A1 | 1/2003 | Yuen et al. | |
| 2003/0009331 A1* | 1/2003 | Schalkwyk et al. | 704/237 |
| 2003/0055651 A1 | 3/2003 | Pfeiffer et al. | |
| 2003/0061027 A1* | 3/2003 | Weise et al. | 704/9 |
| 2003/0069729 A1 | 4/2003 | Bickley et al. | |
| 2004/0015350 A1 | 1/2004 | Gandhi et al. | |
| 2004/0158468 A1* | 8/2004 | Baker | 704/238 |
| 2005/0091057 A1 | 4/2005 | Phillips et al. | |
| 2006/0025997 A1 | 2/2006 | Law et al. | |
| 2006/0190252 A1 | 8/2006 | Starkie | |
| 2006/0203980 A1 | 9/2006 | Starkie | |
| 2008/0126089 A1 | 5/2008 | Printz et al. | |
| 2008/0319738 A1 | 12/2008 | Liu et al. | |

FOREIGN PATENT DOCUMENTS

| | | |
|---|---|---|
| EP | 0 685 955 A2 | 12/1995 |
| EP | 0 700 031 A1 | 3/1996 |
| EP | 0 890 942 A2 | 1/1999 |
| EP | 0 992 980 A2 | 4/2000 |
| EP | 1 207 518 A2 | 5/2002 |
| WO | WO 98/50907 A1 | 11/1998 |
| WO | WO 99/14689 A1 | 3/1999 |
| WO | WO 00/05708 A1 | 2/2000 |
| WO | WO 00/51016 | 8/2000 |
| WO | WO 00/78022 | 12/2000 |
| WO | WO 00/078022 A1 | 12/2000 |
| WO | WO 02/37268 A2 | 5/2002 |
| WO | WO 02/063460 A2 | 8/2002 |
| WO | WO 02/103673 A1 | 12/2002 |
| WO | WO 2004/010678 | 1/2004 |
| WO | WO 2004/010678 A1 | 1/2004 |

OTHER PUBLICATIONS

Ritchie, Completeness Conditions for Mixed Strategy Bidirectional Parsing, Association for Computational Linguistics, ACM, 1999, V25, #4, pp. 457-486.*

Aho, A. V., et al., "*The Theory of Parsing, Translation, and Compiling*," Prentice-Hall, Englewood Cliffs, New Jersey, (1972) p. 146.

Angluin, D., "*Inference of Reversible Languages*," Journal of the Association for Computational Machinery, vol. 29, No. 3, (1982) pp. 741-765.

Starkie, B., "*Inferring Attribute Grammars with Structured Data for Natural Language Processing*," 6$^{th}$ International Colloquium, ICGI 2002, Berlin Germany: Springer-Verlag, (2002) pp. 1-12.

Knuth, D. E., "*Semantics of Context-Free Languages*," originally published in Mathematical Systems Theory 2, (1968) pp. 127-145, republished in "Selected Papers in Computer Languages," CSLI Publications, Center for the Study of Languages and Information, (2003) pp. 377-400.

Harris, Z. S., "*Structural Linguistics*," University of Chicago Press, Chicago, IL, USA and London, UK, 7$^{th}$ edition (1966), formerly entitled: "*Methods in Structural Linguistics*," (1951) pp. 243-299.

ISO/IEC 13211-1:1995, "*Information Technology—Programming languages—Prolo—Part 1: General core*," International Organization for Standardization, New York, New York, (1995) pp. 1-199.

Oates, T., et al., "*Learning k-Reversible Context-Free Grammars from Positive Structural Examples*," Department of Computer Science and Electrical Engineering, University of Maryland Baltimore County, Baltimore, MD, pp. 1-7, 2002.

Sakakibara, Y., "*Efficient Learning of Context-Free Grammars from Positive Structural Examples*," Information and Computation 97, (1992) pp. 23-60.

Gold, E. M., "*Language Identification in the Limit*," Academic Press (1967), pp. 447-474.

Hunt, A., et al., Speech Recognition Grammar Specification Version 1.0 <http://www.w3.org/TR/speech-grammar/>, W3C Recommendation, (2004) pp. 1-94.

Van Zaanen, M., "*Bootstrapping Structure into Language: Alignment-Based Learning*," Phd Thesis, The University of Leeds School of Computing, (2001), pp. i-xi and 1-128.

Starkie, et al., *Lyrebird: Developing Spoken Dialog Systems Using Examples*, Telstra New Wave Pty Ltd., Jan. 1, 2002 XP-002519592, URL: http://www.springerlink.com/content/9fq6d51u0mqa7mtj/>, pp. 1-3.

Starkie, *Programming Spoken Dialogs Using Grammatical Inference*, Telstra New Wave Pty Ltd., AI 2001 Advances in Artificial Intelligence, XP002519591, pp. 449-460.

Allen, J., "*Natural Language Understanding*," The Benjamin/Cummings Publishing Company Inc., Redwood City, CA USA (1995) pp. 46-53.

Ahonen, H., et al., "*Forming Grammars for Structured Documents: An Application of Grammatical Inference*" Procedure of the Second International Colloquium on Grammatical Inference and Applications, (1994) pp. 153-167.

Frost, R.A., "*Speechnet: A Network of Hyperlinked Speech-Accessible Objects*," International Conference on Advanced issued of E-Commerce and Web-Based Information Systems, WECWIS, Ontatio, Canada, (Apr. 8-9, 1999) pp. 116-121.

Garofolo, J., et al., "*The DARPA TIMIT Acoustic-Phonetic Continuous Speech Corpus*," NIST Speech Disc CD1-1.1, (Oct. 1990) pp. 342.

Levenstein, V. I.,"*Binary Codes Capable of Corivcting Deletions, Insertions, and Reversals*," Soviet Physics-Doklady, vol. 10, No. 9, (Feb. 1966) pp. 707-710.

Minker, W., "*Stochastic Versus Rule-Based Speech Understanding for Information Retrieved,* " Speech Communications 25, Spoken Language Processing Group, LIMSI-CNRS, Orsay Cedex, France, (1998) pp. 223-247.

Mitchell, T. M., "*Machine Learning*," Chapter 7. Computational Learning Theory, McGraw-Hill, Boston, MA USA (1997) pp. 201-227.

Nevill, C., et al., "*Compression and Explanation Using Hierarchical Grammars*," Computer Science Department, University of Waikato, New Zealand, The Computer Journal, vol. 40, No. 2/3, (1997) pp. 103-116.

Nuance V-Builder 2.0 NVP Edition Technical Data Sheet, <http://www.nuance.com/assets/pdf/vbuilder_tech_data_sheet_1102.pdf>, (2002) pp. 1-2.

Nuance V-Builder Web Page, <http://web.archive.org/web/20020201161856/www.nuance.com/products/vbuilder.html>, (2002) pp. 1-2.

Rabiner, L. R., et al., "*Fundamentals of Speech Recognition*," Chapter 2. The Speech Signal: Production, Perception, and Acoustic-Phonetic Characterization, Prentice Hall, Englewood Cliffs, New Jersey USA (1993) pp. 11-37.

Ramming, J. C., "*PML: A Language Interface to Distributed Voice-Response Units*," Lecture Notes in Computer Science, vol. 1686, (1998) pp. 97-112.

Ryan, T. P., "*Modern Regression Methods*," John Wiley and Sons, Inc. (1996) pp. 21-30.

Stolcke, A., "*Bayesian Learning of Probabilistic Language Models*," Dissertation, University of California at Berley, (1994) pp. 1-84.

Telera AppBuilder Data Sheet, <http://telera.com/stageone/files/Telera/collateral/app_builder_3-2-_hi.pdf>, (2002) pp. 1-2.

The Voice Web Application Development Environment, Telera White Paper, <http://telera.com/stageone/files/Telera/collateral/AppDev_WP_4-18-02.pdf., (2001) pp. 1-8.

Thomas, I., et al., "*Extracting Phoneme Pronunciation Information from Corpara*," Proceedings of the Joint Conference on New Methods in Language Processing and Computational Language Learning, Association for Computational Linguistics, Somerset, New Jersey, (1998) pp. 175-183.

VoiceXML Forum, <http://voicexml.org>, (2007) pp. 1-2.

Voxeo Designer 2.0 Web Page, <http://web.archive.org/web/20020205091431/community/voxeo.com/vd2.isp>, (2002) pp. 1-10.

Levin, et al., *A Stochastic Model of Human-Machine Interaction for Learning Dialog Strategies*, IEEE Transactions on Speech and Audio Processing, (Jan. 2000) pp. 11-23, vol. 8, No. 1, New York, NY US, Publisher Item Identifier S 1063-6676(00)00296-0.

Lopez-Cozar, et al., *Testing Dialogue Systems by Means of Automatic Generation of Conversations*, Interacting with Computers, Science Direct—on—line, (Jul. 2002) Elsevier Science B.V. Issn: 0953-5438, pp. 1-21, XP-002569525, http://www.sciencedirect.com, European Patent Office, http://dx.doi.org/10.1016/S0953-5438(02)0019-X> [Retrieved on Feb. 19, 2010 from the Internet].

Takashi Yokomori, "Polynomial-time Identification of Very Simple Grammars from Positive Data," Elsevier, Theoretical Computer Science 298 (2003) 179-206; 28 pages.

Adreas Stolcke, et al.; "Inducing Probabilistic Grammars by Bayesian Model Merging," International Computer Science Institute, XP-002381959, cmp-lg/9409010 Sep. 13, 1994; 14 pages.

EP 04 73 0163 Supplementary Partial European Search Report, Dated Jul. 21, 2011.

* cited by examiner

SYSTEM AND PROCESS FOR GRAMMATICAL INFERENCE

FIELD OF THE INVENTION

The present invention relates to a system and process for grammatical inference that may be used in developing an interactive system.

BACKGROUND

A dialog system has a text or audio interface, allowing a human to interact with the system. Particularly advantageous are 'natural language' dialog systems that interact using a language syntax that is 'natural' to a human. A dialog system is a computer or an Interactive Voice Response (IVR) system that operates under the control of a dialog application that defines the language syntax, and in particular the prompts and grammars of the syntax. For example, IVRs, such as Nortel's Periphonics™ IVR, are used in communications networks to receive voice calls from parties. An IVR is able to generate and send voice prompts to a party and receive and interpret the party's voice responses made in reply. However, the development of a dialog system is cumbersome and typically requires expertise in both programming and the development of grammars that provide language models. Consequently, the development process is often slower than desired.

One approach to reducing the time and expertise of developing natural language dialog systems is to use processes whereby a relatively small amount of data describing the task to be performed is provided to a development system. The development system can then transform this data into system code and configuration data that can be deployed on a dialog system, as described in the specification of International Patent Application No. PCT/AU00/00651 ("Starkie (2000)"), incorporated herein by reference. However, one difficulty of this process is that the development system needs to make numerous assumptions, some of which may result in the creation of prompts that, while understandable to most humans, could be expressed in a manner more easily understood by humans. For example, a prompt may be created that prompts a person to provide the name of company whose stocks they wish to purchase. The development system might create a prompt such as "Please say the company", whereas the phrase "Please say the name of the company whose stocks you wish to purchase" may be more understandable to a human interacting with the dialog system.

As described in Starkie (2000), another approach for reducing the time and expertise requirements for developing a natural language dialog system is to use processes whereby developers provide examples of sentences that a human would use when interacting with the dialog system. A development system can convert these example sentences into a grammar that can be deployed on a computer or IVR. This technique is known as grammatical inference. Successful grammatical inference results in the creation of grammars that:

(i) cover a large proportion of the phrases that people will use when interacting with the dialog system;
(ii) attach the correct meaning to those phrases
(iii) only cover a small number of phrases that people won't use when interacting with the dialog system; and
(iv) require the developer to provide a minimal number of example phrases.

The use of grammatical inference to build a dialog system is an example of development by example, whereby a developer can specify a limited set of examples of how the dialog system should behave, rather than developing a system that defines the complete set of possible examples.

Thus a development system can be provided with a list of example sentences that a human would use in reply to a particular question asked by a dialog system. These example sentences can be defined by a developer or by recording or transcribing the interactions between a human and a dialog system when the dialog system has failed to understand the sentence that the human has used. In addition, a development system can be provided with a list of interactions between a human and a dialog system using a notation that lists the sentences in the order they are spoken or written, indicating whether it is either the dialog system or the human that is speaking (or writing). This is referred to as an example interaction. Similarly, an example interaction can be defined by recording or transcribing the interactions between two or more humans, or between a human and a dialog system when the dialog system has failed to understand the sentence that the human has used. A benefit of this technique is that example interactions are understandable to anybody who understands the language contained within them. In addition, most people would be capable of creating example interactions of desired behaviour. There is also the benefit that example interactions describe specific behaviours, given a set of inputs, and therefore provide test cases for the behaviour of the dialog system. As they document specific behaviour, there is also a reduced risk of errors being introduced in the specification of the dialog system for the given behaviour listed in the example interactions. Example interactions are also ideal forms of documentation to describe the behaviour of the dialog system to others.

Example interactions can be annotated to include high level descriptions of the meaning of a sentence. This annotation might include the class of the sentence, and any key pieces of information contained in the phrase, known as slots. For example, the sentence "I want to buy three hundred acme bolt shares" might be annotated to signify that the class of the sentence is buy_stocks as opposed to sell_stocks, and that the quantity slot of the sentence is 300, while the stockname slot is "acme bolt".

A grammatical inference process for developing an interactive development system is described in Starkie (2000). The grammatical inference process generates the example sentences used to infer the grammar, and the process is capable of generalising the inferred grammar so that it can be used to generate many more phrases than the training examples used to infer the grammar. A limitation of existing grammatical inference processes is that given a set of training sentences that the grammar is required to generate, referred to as positive examples, there is always more than one possible grammar that could generate those sentences. Therefore mathematically it is provable that it is not possible for the grammatical inference process to infer the grammar exactly. One approach to overcome this problem is to enable the developer to sample the inferred grammar and provide additional sentences to guide the grammatical inference process to infer the correct grammar. It is provable that even under these circumstances it is still not possible for the grammatical inference process to eventually infer the correct grammar.

However, it is possible for the inference process to eventually infer the exact solution over one or more iterations if one of the two approaches are used: either only a sub-set of all possible context-free languages can be learnt, or the developer can provide additional but grammatically incorrect sentences that should not be generated by the grammar, referred to as negative examples. A process that can do this is referred to as an identification in the limit process. Both of these approaches will be advantageous if they reduce the amount of development required to build the grammars. In addition, the developer can guide the grammatical inference by providing positive and negative examples even if they don't know what the underlying grammar should be. All that is required is that they can identify that a given sentence should or should not be covered by the grammar. This is not surprising because humans create the training examples and the exact model of language used by humans when formulating sentences is not known.

As described in Gold, E. M. [1967] *Language identification in the limit, in Information and Control,* 10(5):447-474, 1967 ("Gold"), it was demonstrated in 1967 that the grammars used to model natural languages at that time could be learnt deterministically from examples sentences generated by that grammar, but that it was possible for a language to be learnt from both examples sentences generated from that grammar, referred to as positive examples, and examples of bad sentences that are not generated from that grammar, referred to as negative examples.

Gold's findings contradicted the findings of psycholinguists that children are rarely informed of their grammatical errors, yet children do eventually learn natural languages. To reconcile this contradiction, Gold suggested that, even if the classes of grammars known at that time could not be learnt from arbitrarily presented text, there might be ways in which these grammar classes could be restricted in such a way that they could be learnt.

As described in Angulin D. [1982] *Inference of Reversible Languages,* in Journal of the Association for Computational Machinery 29, p 741-765 ("Angulin"), it was subsequently shown that some classes of grammar could be learnt from example sentences, the most notable of which was referred to as the K-Reversible class of regular language. Angulin also described a process for inferring K-Reversible regular languages. However, this class of grammar is not powerful enough to describe some of the constructs found in human language.

Sakakibara, Y. [1992] *Efficient Learning of context-free grammars from positive structural examples,* in Information and Computation, 97. 23-60 ("Sakakibara"), defined a subset of context free grammars was defined that could be inferred from positive (in the sense of positive examples described above) unlabelled derivation trees, and a process for doing so. An unlabelled derivation tree is a parse tree in which the non-terminal names attached to edges in the tree are unknown. The processes described in Sakakibara, and also in Oates, T., Devina D., Bhat, V. [2001], *Learning k-reversible Context-free grammars from Positive Structural Examples,* available at http://citeseer.nj.nec.com/544938.html, can only be applied when the structure of the grammar is partially known.

However, no sub class of context free grammars has yet been identified that can be deterministically learnt from unlabelled examples. Instead, most prior art processes use some probabilistic or heuristic bias.

Van Zaanen, M. [2001], *Bootstrapping Structure into Language: Alignment-Based Learning,* Phd Thesis, The University of Leeds School of Computing, ("Van Zaanen") describes a new unsupervised learning framework know as alignment based learning that is based upon the alignment of sentences and a notion of substitutability described in Harris, Z. S. [1951], *Structural Linguistics,* University of Chicago Press, Chicago Ill., USA and London, UK, 7th (1966) edition, formerly entitled: *Methods in Structural Linguistics.* The technique involves the alignment of pairs of sentences in a corpus of sentences. Sentences are partitioned into substrings that are common and substrings that are not. An assumption of the technique is that the common substrings are generated by a common rule, and the portions of the sentences that are not common can be represented by rules that are interchangeable. For instance, consider the two sentences Bert is baking [a biscuit]$_{x1...(1)}$
Ernie is eating [a biscuit]$_{x1...(2)}$ Using alignment based learning, a learner might align the two sentences such the phrase "a biscuit" is identified as being common to both, and therefore concludes that the two phrases are generated by the same rules. Similarly, the learner may conclude that the phrases "Bert is baking" "Ernie is eating" are interchangeable, resulting in the rules:

S->X2 X1
X2->bert is baking
X2->ernie is eating
X1->a biscuit

In this notation, each line represents a rule whereby the symbol on the left hand side can be expanded into the symbols on the right hand side of the rule. Symbols are defined as either terminal or non-terminal symbols. A non-terminal symbol is a symbol that can be expanded into other symbols. A non-terminal can appear on either the left hand side or the right hand side of a rule, and always begins with an upper case letter. In contrast, a terminal symbol cannot appear on the left hand side of a rule, and always begins with a lower case letter. The non-terminal "S" is a special non-terminal represents an entire sentence.

If a third phrase is introduced as follows:

Bert is baking [a cake]$_{x1...(3)}$

The substring "Bert is baking" may then be identified as being common to both example (1) and (3), resulting in the addition of the rule X1->a cake The resultant grammar can now be used to generate an additional phrase Ernie is eating a cake--(4)

Alignment based learning suffers from a series of problems. The first of these problems is that two strings can often be aligned multiple ways and selecting the correct alignments to identify constituents is nondeterministic. For instance, consider the two phrases:

From england to sesame street new york
From sesame street to sydney

A large number of alignments are possible, two interesting ones to consider are $$\begin{pmatrix} \text{from england to sesame street new york} -- \\ \text{from}--\text{sesame street new york to australia} \end{pmatrix}$$

and $$\begin{pmatrix} \text{from england}---\text{to sesame street new york} \\ \text{from sesame street new new york to australia}--- \end{pmatrix}$$

The first of these alignments requires 2 deletions and 2 insertions, compared to 2 substitutions, 3 insertions, and 3 deletions for later. Despite requiring a greater number of insertions, deletions and substitutions, the second alignment would result in the following grammar:

S->from Place to Place
Place->england
Place->sesame street new york
Place->australia This grammar is closely aligned to the English language, and thus it is clear that using alignments that minimize the number of insertions, deletions and substitutions is not always the most desirable strategy.

A second problem of alignment-based learning is that is can result in overlapping constituents. This undesirable situation arises from the fact that it is not guaranteed that substrings common to two phrases are generated from the same rules. For instance, consider the following three training examples:
   oscar sees the apple.
   big bird throws the apple.
   big bird walks.
Aligning the first two sentences can result in the creation of the following rules:
   X1->oscar sees
   X1->big bird throws.
Aligning the last two sentences can result in the creation of the following rules:
   X2->throws the apple
   X2->walks
The sentence "big bird throws the apple" thus contains the constituents, "big bird throws" and "throws the apple". These constituents overlap, and if the sentence is created using a context-free grammar, then the sentence can only contain one of these constituents.

A third problem with alignment based learning is that it is not guaranteed that substrings used interchangeably in one part of the language can be interchanged everywhere. For instance, consider the following three sentences:
   that bus is white
   that bus is going downtown
   john bought some white ink
Aligning the first two sentences can result in the creation of the following two rules:
   X1->white
   X1->going downtown
If it is assumed that substrings used interchangeably in one part of the language can be interchanged everywhere, then the following would be expected to be a legitimate English sentence when in fact it is not:
   john bought some going downtown ink.

As described in Starkie (2000), it is a requirement of dialog systems to understand the meaning of sentences presented to them as either spoken or written sentences. Traditionally, spoken dialog systems use attribute grammars to attach meanings to sentences in the form of key value pairs. This was first described by D. E. Knuth, in "Semantics of context-free languages", Mathematical Systems Theory 2(2): 127-45 (1968). Most commercial speech recognition systems such as Nuance and Scansoft use attribute grammars to attach meanings to sentences, and the W3C "international Speech Recognition Grammar Specification" (SRGS) standard, described at http://www.w3.org/TR/speech-grammar, is an attribute grammar.

Attribute grammars attach meanings to sentences in the form of key value pairs, as follows. For example, the expression:
   i'd like to fly from melbourne to sydney
can be represented by the attributes:
   {op=bookflight from=melbourne to=sydney}
The values of attributes can be arbitrarily complex data structures including attributes, lists, lists of attributes numbers and strings. As described in B Starkie, *Inferring attribute grammars with structured data for natural Grammar processing, in Grammatical Inference: Process and Applications;* 6th International Colloquium, ICGI 2002, Berlin, Germany: Springer-Verlag ("Starkie (2002)"), all instances of arbitrarily complex data structures can be represented by one or more unstructured attributes using the same notation used in the "C" and JavaScript programming languages to assign values to members of complex data structures. For instance, a data structure with n unstructured elements such as a date can be represented as n unstructured attributes, for instance:
   date.day=1 date.month=january date.year=2004.
Similar notations are described in Starkie (2002) for structures containing structured elements, lists, numbers and concatenated strings. For that reason the following description is limited to the inference of grammars that convert between sentences and unstructured attributes. It will be apparent to those skilled in the art that the process can be extended to infer grammars that can convert between sentences and arbitrarily complex data structures using the techniques described in Starkie (2002).

An alternative grammar formalism for attaching datastructures to sentences and vice-versa is the unification grammar. The most commonly used unification grammar is the Definite Clause Grammar (DCG) that forms part of the Prolog programming language, as described in *ISO/IEC* 13211-1 *Information technology—Programming languages—Prolog—Part 1: General core*, New York, N.Y., International Organisation for Standardization ("ISO 1995"). Depending upon the exact form of attribute grammar and unification grammar, most attribute grammars can be transformed into unification grammars, but some unification grammars cannot be rewritten as attribute grammars without the loss of some information.

It is desired to provide a grammatical inference system and process that alleviate one or more of the above difficulties, or at least provide a useful alternative.

SUMMARY OF THE INVENTION

In accordance with the present invention, there is provided a process for inferring a grammar from a plurality of example sentences, including:
   selecting sentences having a common suffix or prefix component;
   identifying the other of said suffix or prefix component of each selected sentence;
   generating rules for generating the example sentences and the other components; and
   reducing the right hand side of each rule on the basis of the right hand sides of the other rules.

The present invention also provides a process for inferring a grammar from a plurality of positive and negative example sentences and a starting grammar, including:
   identifying one or more shortest prefix components common only to said plurality of negative example sentences;
   identifying rules of the starting grammar for generating said one or more shortest prefix components; and
   removing one or more of said one or more shortest prefix components by removing one or more of said rules.

The present invention also provides a process for inferring a grammar in the limit from a plurality of positive and negative example sentences, including:
   identifying in the limit a grammar from only the positive example sentences using machine learning; and
   generating, on the basis of said grammar and said plurality of positive and negative example sentences, an output grammar that can generate all of the positive example sentences but cannot generate any of the negative example sentences.

The present invention also provides a process for inferring a grammar from a plurality of positive and negative example sentences, including:

generating in the limit a class of grammar from only the positive example sentences; and removing recursion from the grammar.

The present invention also provides a process for inferring a grammar from a plurality of example sentences, including:

generating rules for generating said plurality of example sentences; and reducing one or more of said rules.

The present invention also provides a grammatical inference system, including a merging component for selecting sentences having a common suffix or prefix component; identifying the other of said suffix or prefix component of each selected sentence; generating rules for generating the example sentences and the other components; reducing the right hand side of each rule on the basis of the right hand sides of the other rules; and generating a grammar on the basis of the reduced rules.

The present invention also provides a grammatical inference system adapted to generate rules for generating a plurality of example sentences; and to reduce one or more of said rules.

This specification describes processes for inferring a class of unification grammar that can be converted to an attribute grammar suitable for use with a commercial speech recognition system. Alternatively, if a text-based dialog system is used, the unification grammar formalism can be used as is.

The processes described herein infer a context-free grammar from example sentences generated from that grammar. The processes restrict the form that the context-free can take such that:

(a) if the grammar that is being inferred has those restrictions, then the process will learn it; and (b) if the language that is being inferred does not have those restrictions, then the process will learn the closest match to it.

The class of grammar that is inferred by such a grammatical inference process is referred to as the class of left-aligned grammars. A left-aligned grammar is a type of context-free grammar that can be used with any speech recognition or natural language processing software that uses context-free grammars.

One benefit of the process is that if a human being was given the task of writing a left-aligned grammar that generated a set of example sentences, then the human would not do a better job than the process described herein. The reason for this is that, given a sufficiently large enough set of training examples (at least one example sentence per rule in the grammar) referred to as a super characteristic set of examples and, generated from a left-aligned language described by a left aligned grammar, then there is no other left-aligned language that is a proper subset of the target language that can also generate the training examples. More formally, let G be the target left aligned grammar, and L(G) be the language described by G. Let $S \subset L(G)$ be a super-characteristic set of sentences of G. Then there does not exist another left aligned grammar $G_2$ such that $S \subset L(G_2)$, and $L(G_2) \subset L(G)$.

Starkie (2000) describes a method of using grammatical inference to develop a spoken dialog system. The grammatical inference process described herein represents an advance on the method described in Starkie 2000. The processes described herein infer a context-free grammar from example sentences generated from that grammar.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENTS

Figure 1:
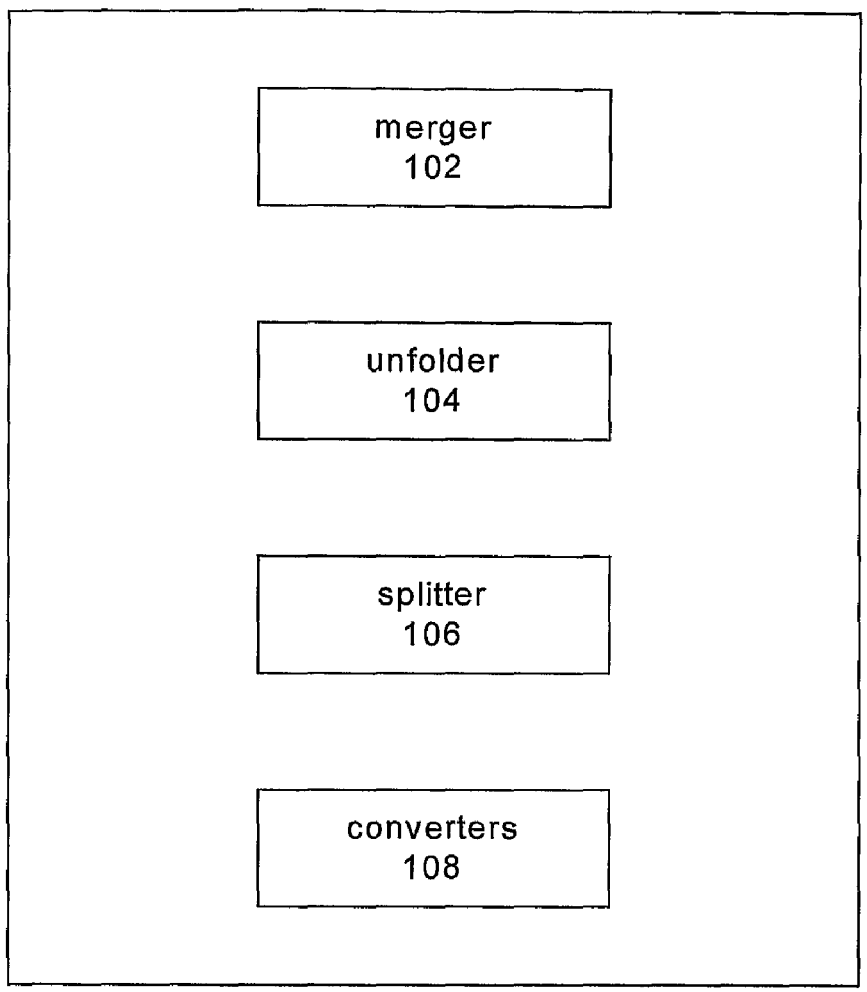
FIG. 1 is a block diagram of a first preferred embodiment of a grammatical inference system.
Figure 2:
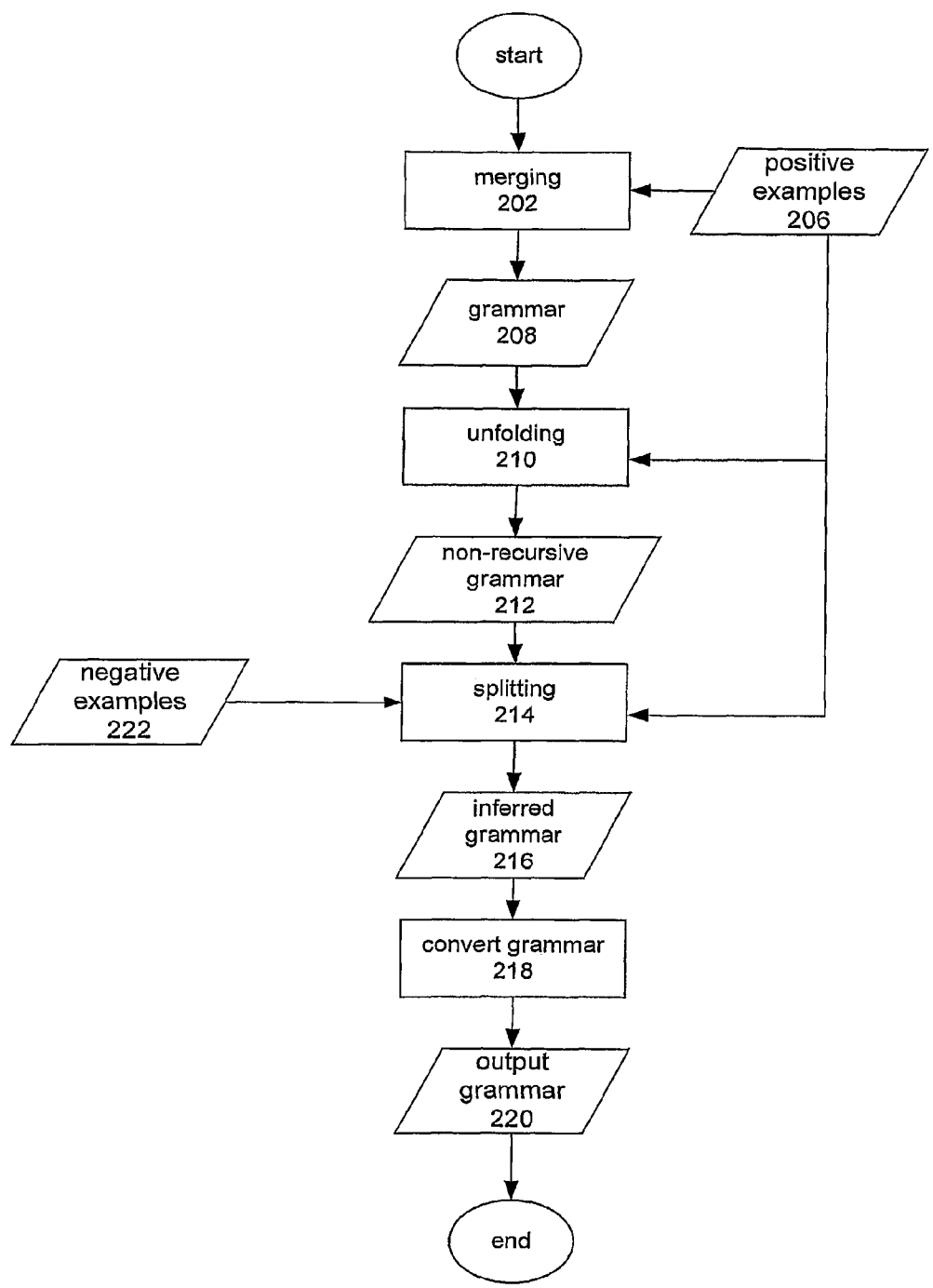
FIG. 2 is a flow diagram of a grammatical inference process executed by the grammatical inference system of the first preferred embodiment.

As shown in FIG. 1, a grammatical inference system includes a merger or merging component 102, a splitter or splitting component 106, and one or more converters 108. Optionally, the grammatical inference system may also include an unfolder or unfolding component 104. The grammatical inference system executes a grammatical inference process, as shown in FIG. 2, that infers a final or inferred grammar 216 from a set of positive example sentences 206 and a set of negative example sentences 222. The inferred grammar 216 can then be converted into a form suitable for use with a spoken or text-based dialog system, as described below.

In the described embodiment, the grammatical inference system is a standard computer system such as an Intel™ IA-32 personal computer including a Pentium™ processor, random access memory (RAM), and non-volatile (e.g., magnetic disk) storage, and the grammatical inference process is implemented by software modules stored on the non-volatile storage of the computer and executed by the processor. However, it will be apparent to those skilled in the art that at least parts of the grammatical inference process can alternatively be implemented by dedicated hardware components, such as application-specific integrated circuits (ASICs).

The grammatical inference process takes as its input a set of positive example sentences 206 which represent a subset of the sentences that the final grammar 216 should be able to generate. These sentences are typically stored on a computer readable storage medium such as a hard disk or CD-ROM, and can be labelled with key=value pairs that represent the meaning of the sentence, as used by the dialog being developed. If it is desired that the meaning of a sentence be represented by a complex structure such as a list, then these complex data structures are mapped into unstructured pairs as defined in Starkie (2002). For instance, instead of having a structured attribute that represents a structure with fixed unstructured elements, each element of the structure is represented by an unstructured attribute. For instance instead of date={day=1 month=june year=2003}, three elements of the form date.day=1 date.month=june date.year=2003 are used.

Each element in the set of positive examples has an identifier to denote which start symbol is required to generate the sentence, in the case where an application has more than one start symbol, as described below.

The grammars 208, 212 and 216, as well as intermediate grammars created by the merging process 202, the unfolding process 210, and the splitting process 214 are generated in a format described below. At the completion of the grammatical inference process, the inferred or final grammar 216 output from the splitting process 214 can converted into an alternative format 220 by one of the converters 108. For instance, it may be converted to an SRGS grammar suitable for use with a speech recognition system or it may be converted into JavaScript that generates prompts suitable for the creation of output text for a text to speech system or visual display such as that described in International Patent Application No. PCT/AU03/00939 ("Starkie (2003)"). Alternatively, it could be converted into a JavaScript application that generates concatenated sound files, as described in Starkie 2003, or a proprietary speech recognition grammar format, or an alternative unification grammar format such as a definite clause grammar.

The grammars 208, 212, 216 generated by the grammatical inference system are unification grammars that can be used to convert data-structures representing the meanings of sentences into the words of the sentence via a process that is referred to herein as expansion. Alternatively, the grammars 208, 212, 216 can be used to convert the words of a sentence into a data structure representing the meaning of the sentence via a parsing process. The format of these unification grammars 208, 212, 216 is as follows:

```
Hidden_sense_grammar : signature_definition startsymbols rules ;
signature_definition :
  "%slot" '{' '\n'
  type_definitions
  '}' '\n'
  |
;
type_definitions :
  type_definition type_definitions |
  type_definition |
;
type_definition :
  TERMINAL TERMINAL '\n'
;
startsymbols :
       startsymbol |
       startsymbol startsymbols |
;
startsymbol : "%start" NONTERMINAL
rules : rules rule | rule | ;
rule : prefix symbol "-->" symbols '\n' ;
symbols :
       symbols symbol |
       symbol ;
symbol :
       NONTERMINAL '(' parameters   |
       NONTERMINAL '(' ')'   |
       NONTERMINAL |
       TERMINAL '(' parameters   |
       TERMINAL
;
parameters :
       '-' parameters |
       INTEGER parameters |
       VARIABLE parameters |
       TERMINAL parameters |
       STRING parameters |
       ')'
;
parameter : TERMINAL ',' |
STRING ;
prefix :
       '!'   |
       '!' '!' |
;
  INTEGER:      "[0-9]+" ;
  STRING:       "\"[^\"]*?\"" ;
  VARIABLE:     "\?[a-z0-9a-z_\.]*";
  TERMINAL:     "[a-z][a-z0-9a-z'_\.]*";
  NONTERMINAL:  "[A-Z][A-Z0-9a-z_\.]*";
```

A unification grammar is comprised of a set of rewrite rules that define respective transformations of sequences of terms to other sequences of terms. A term is comprised of a root and a signature. The root is a symbol and the signature is an ordered list of symbols. All terms in a language have the same number of elements in its signature. For example the term "City(-?from)" has the root "City" and the signature "(-?from)". If a term does not explicitly show a signature then it contains a finite number of instances of the symbol "-". A signature that contains only one or more instances of the symbol "-" within parentheses is referred to as an empty signature. For instance, the term "sydney" has the root "sydney" and the empty signature "(- -)". The notation root(X) denotes the root of X.

Every term is categorised as either a terminal or a non-terminal. Terminals always have an empty signature and a root that begins with a lower case symbol. Non-terminals always have a root that begins with an upper case letter. A grammar contains rewrite rules that define ways in which non-terminal terms can be transformed into sequences of one or more terms. Similarly, the term "non-terminal symbol" denotes the root of a non-terminal term, and the term "terminal symbol" denotes the root of a terminal term.

In this specification an uppercase letter is used to represent any non-terminal symbol (e.g., "A"), a lowercase symbol to represent any terminal symbol (e.g., "a") and a Greek letter is used to represent a symbol that could be either terminal or non-terminal (e.g., $\Omega$ or $\Psi$). The notation A(x) represents a term with an unknown number of symbols in its signature and |x| denotes the length of the signature. An italic uppercase letter is used to represent a sequence of zero or more terminals or non-terminal terms (e.g. *A*) and an italic bold uppercase letter represents a sequence of one or more terms, either terminal or non-terminal (e.g. *A*). The notation |*A*| denotes the number of terms in *A*. Lowercase italic letters represent a sequence of zero or more terminal terms (e.g., *a*) and bold italic lowercase letters represent a sequence of one or more terminal terms (e.g., *a*).

An example grammar using this notation is shown below. This grammar is a form of unification grammar.

```
%slots {
to from
from from
}
%start S
S(?to ?from ) --> i'd like to fly S(?to ?from )
S(?to ?from ) --> S(?to - ) S(- ?from )
S(- ?from ) --> from City(- ?from )
S(?to - ) --> to City(- ?to )
City(- "sydney" ) --> sydney
City(- "melbourne" ) --> melbourne
City(- "canberra" ) --> canberra
```

The first part of a grammar is a signature definition. The signature definition shown above states that all terms in the grammar have two parameters namely a "to" attribute and a "from" attribute. Both of these attributes are of the same type, specifically the type "from". The type of an attribute implicitly defines the set of values that an attribute can take. The notation $key_G(i)$ denotes the key of the $i^{th}$ slot in the signature definition of the grammar G, $key_G(i)$ denotes the key of the $i^{th}$ slot in the signature definition of the grammar G and A[i] denotes the value of the $i^{th}$ slot of a signature A. The value of a signature can be alternatively expressed as a set of key value pairs as follows. Let (x) be a signature, and Y be a set of key value pairs (k,v). x is said to be equivalent to Y, denoted x≡Y, if and only if $$Y\{(k,v)|\forall i \leq |x|, v=x[i], key_G(i)=k\}$$

After the signature definition comes the list of start symbols. Any sentence that is described by this grammar can be generated by expanding a term whose root is a start symbol. The process of expansion is repeated until no non-terminal terms exist in the term sequence. In the example above there is only one start symbol, which is the symbol "S". In a dialog system, there may be a separate non-terminal used to represent the possibly infinite set of sentences that can be spoken or entered at each state of the dialog. Alternatively, there can be a separate start symbol for each action that can be taken by an application, as is the case with the VoiceXML standard.

After the list of start symbols, the rewrite rules of the grammar are listed. Each rewrite rule consists of a left hand side which consists of a non-terminal term. The signature of this term consists of a list of variables or constants contained within a pair of round brackets. The signature contains as many elements as there are elements in the signature definition. A variable consists of the symbol '?' followed by a unique name. The right hand side consists of a number of terms, either terminal or non-terminal. If the rule is well formed, then for every variable in the signature of the left hand side of a rewrite rule, there is exactly one instance of that variable contained in the signature of exactly one non-terminal on the right hand side of the rewrite rule. Similarly, for every variable in the signature of a non-terminal on the right hand side of rule, there is exactly one instance of that variable in the signature on the left hand side of the rewrite rule.

For instance, the rule "S(?to ?from)-->S(?to -) S(-?from)" contains one instance of the variable "?from" on the left hand side and exactly one instance of "?from" on the right hand side of the rule.

A special constant that can appear in the signature is the symbol -. This symbol denotes that the attribute referenced by the position in the signature is empty. All other symbols are constants. No constants can appear in the signature of any symbol on the right hand side of a rule. In the preferred embodiment, a non-terminal can be shown without a signature, which is a short hand notation for a signature with all slots set to -.

Sentences can be created by expanding a start symbol, and then continuing to expand non-terminals until no more non-terminals exist. Before each non-terminal is expanded, all variables in the signature on the left-hand side of the rule need to be instantiated to a constant value via a process referred to as unification. For instance, consider a sentence that can be generated which describes the meaning from="sydney" to = "melbourne" using the grammar above. First, the non-terminal S("melbourne" "sydney") is created. Here the signature definition tells us that the first slot should be replaced by the value of the "to" attribute, and the second slot should be replaced by the value of the "from" attribute. If the "from" slot was undefined, the constant "-" is used. Next, a rule is selected to expand the symbol S("melbourne" "sydney"). In the example above, there are four rules that can be used to expand the symbol S. A rule can be selected for expansion if the signature of the non-terminal to be expanded unifies with the symbols in the signature on the left hand side of a rule. Two signatures are said to unify if there is a set of mappings σ: t→u for the variables in the signatures such that if you replace the variables with their mappings, the two signatures are identical. The notation $L^σ$ denotes the result of applying the substitution σ to L. For instance, in the above example the signature ("melbourne" "sydney") unifies with (?to ?from) using the mapping σ=(?to->"melbourne", ?from->"sydney"). That is, $(?to\ ?from)^σ$=("melbourne" "sydney"). In contrast, the signature ("melbourne" "sydney") does not unify with the signature (-?from).

In this case one of two rules can be selected: the symbol "S("melbourne" "sydney")" can be expanded to become "i'd like to fly S("melbourne" "sydney")". This can be denoted as the single step expansion S("melbourne" "sydney")⇒i'd like to fly S("melbourne" "sydney"). This process can be repeated by expanding all non-terminals until no more non-terminals exist. For instance:

```
S("melbourne" "sydney")
⇒ i'd like to fly S("melbourne" "sydney")
⇒ i'd like to fly S("melbourne" - ) S(- "sydney" )
⇒ i'd like to fly to City(-"melbourne" ) S(- "sydney" )
⇒ i'd like to fly to melbourne S(- "sydney" )
⇒ i'd like to fly to melbourne from City(- "sydney")
⇒ i'd like to fly to melbourne from sydney.
```

Each one of these steps results in a sequence referred to as a sentential form. For instance, the sequence "i'd like to fly to melbourne S(-"sydney")" is a sentential form. When a sentential form is created by expanding non-terminals top down left to right, any resulting sentential form is referred to as a left-sentential form. When a sentential form is created by expanding non-terminals top down right to left, any resulting sentential form is referred to a right sentential form.

The notation A⇒*B denotes that A can be expanded using zero or single step expansions to become B. Formally, a constituent is defined as an ordered pair (A, B) where A⇒*B. Similarly, a string can be converted to a data structure by a process referred to herein as reduction. Reduction involves applying the rewrite rules in reverse. If these rules are applied left to right, it is possible that a different set of sentential forms exists. For instance:

```
i'd like to fly to melbourne from sydney
⇐ i'd like to fly to City(-"melbourne" ) from sydney
⇐ i'd like to fly S("melbourne" - ) from sydney
⇐ i'd like to fly S("melbourne" - ) from S(- "sydney" )
⇐ i'd like to fly S("melbourne" - ) S(- "sydney" )
⇐ i'd like to fly S( "melbourne" "sydney")
⇐ S( "melbourne" "sydney")
```

Similarly, the notation B⇐*A denotes that B can be transformed to become A via zero or more single step reductions.

A substring of a sentential form is said to unify with the right hand side of a rule if the symbol name of $i^{th}$ symbol in the substring is the same as the $i^{th}$ symbol in the right hand side of the rule and there is a set of mappings for the variables in the signatures such that if you replace the variables with their mappings the two signatures are identical. For instance, in the example above, the substring "from S(-"sydney")" unifies with the right hand side of the rule "S(-?from)-->from City(-?from)" using the mapping (?from->sydney).

A sentential form can only be reduced using a rewrite rule if the right hand side of that rule unifies with a substring of the sentential form. If a sentential form cannot be reduced using any rule of the grammar, then the sentential form is referred to as "irreducible" or a "normal form". Any sentential form arrived by a series of reductions left to right is referred as a leftmost reduction. In the example given above, each leftmost reduction is also a right sentential form. When the normal form obtained via reduction is a start symbol, then there is at least one sequence of expansions of a start symbol that can generate the given sentence. Under these circumstances, the sequence is said to be successfully parsed. In addition the data structure that represents the meaning of the sentence is known; for instance:

```
i'd like to fly to melbourne from sydney ⇐*S( "melbourne" "sydney")
then "i'd like to fly to melbourne from sydney"
is a valid sentence with the meaning { to=
"melbourne" from="Sydney"}.
```

It will be apparent to those skilled in the art that alternative but equivalent representations of unification grammars can be used. For instance, the following attribute grammar is an equivalent grammar to that described above:

```
S -> S0:x1      { to=$x1.to}
S -> S1:x1      { from=$x1.from}
S -> S2:x1      { to=$x1.to from=$x1.from}
City -> sydney      { from="sydney"}
City -> melbourne      { from="melbourne"}
City -> canberra      { from="canberra"}
S0 -> to City:x1      { to=$x1.from}
S1 -> from City:x1      { from=$x1.from}
S2 -> i'd like to fly S2:x1      { to=$x1.to from=$x1.from}
S2 -> S0:x1 S1:x2      { to=$x1.to from=$x2.from}
```

This grammar is written using a notation similar to that described in Starkie (2000). Furthermore, additional information can be included in the grammar format. Possible extensions include:

(i) Complex functions such as arithmetic and user defined functions in place of constants and variables in non-terminal signatures. Although the grammatical inference process described herein cannot generate these complex rules, it can incorporate them from a starting grammar. For example, the following rules can be used to parse the sentence "twenty six" translating it into the attribute number=26

```
%slots{
number number
}
%start S
S(?x*10+?y) --> Tens(?x) SingleDigit(?y)
Tens(2) --> twenty
SingleDigit(6) --> six
```

(ii) Numbers to indicate the relative weighting of rules when used by a speech recogniser, as described in SRGS. For example, the following rules could be used to describe a language comprising of yes or no where yes is expected 70% of the time.

```
S --> yes ~0.7
S --> no ~0.3
```

In addition, the preferred embodiment provides the following additional markings:
(i) Additional markings to direct the way in which the rules of starting grammars are incorporated into inferred grammars during the grammatical inference process (described below);
(ii) Markings to denote that some non-terminals are defined external to the grammar being inferred. For instance generated dynamically during the execution of an application, via a database call (described below); and
(iii) Additional markings to direct the way in which the rules of starting grammars are incorporated into inferred grammars during the grammatical inference process (described below).

To describe the merging process, some additional notation is required. Let y be a signature of a non-terminal, and val(y) denote the unordered list of values (either constants or variables) in y other than '-'. Let pattern(y) be a sequence of 1's and 0's that denotes whether each element of the signature is either not '-' or '-'. Let const(y) denote the unordered list of constants in y. Let var(y) denote the unordered list of variables in y. For instance, if y=("melbourne"-?action 6) then val(y)= {"melbourne", ?action, 6}, pattern(y)=(1011) and const(y)= {"Melbourne", 6}.

The functions const, val and var can be extended to symbols as follows; const(A(x))=const(x), val(A(x))=val(x) and var(A(x))=var(x). The functions const, val and var can also be extended to sequences of two more symbols via simple concatenation, that is, val(A(x)B)=val(A(x))+val(B), const(A(x)B)=const(A(x))+const(B) and var(A(x)B)=var(A(x))+var(B). For instance, val("from City(?city -) on Date(-?date)")= {?city, ?date}.

The grammatical inference process executed by the grammatical inference system infers left aligned languages, and is thus also referred to as the Left alignment process. The left alignment process involves transforming a starting grammar via the following steps:
(i) Addition of rewrite rules;
(ii) Deletion of rewrite rules;
(iii) Expansion of symbols on the right hand side of rewrite rules;
(iv) Reduction of symbols on the right hand side of rewrite rules; and
(v) Merging of non-terminals.

The expansion and reduction of symbols on the right hand side of rules uses the same process as that used to generate or parse sentences as described above; i.e., using the process of unification and substitution.

Returning to FIG. 2, the grammatical inference process begins with a merging process 202. To provide a formal definition of a merging requires a formal definition of a valid reordering of a signature, and method for comparing the roots of symbols. A function reorder is defined in JavaScript as follows:

```
function reorder(A,i,j) {
if (type_G (i) == type_G(j)) { var k; k = A[i], A[i]= A[j], A[j] =k;}
return A;
}
```

The notation A|-|B is used to denote that there exists two integers i and j such that reorder(A, i, j)=B. The notation A|-|*B is used to denote that the signature A can be reordered to become the signature B via zero or more applications of the function reorder. The notation A|-|*$_\zeta$B is used to denote a specific sequence of reordering of signatures $\zeta$ that transforms A to B.

Secondly, a formal definition of an ordering that can be used to compare two symbols is defined as follows. Firstly, reference is made to lexigraphical ordering that will denoted $<_l$. Let A and B be two symbols. All symbols are represented as strings of characters; i.e., $A=A_{1\ 2}\ldots A_{|A|}$. Each character $A_i$ has a value as defined by the coding scheme used such as ASCII, ANSI or unicode. The lexigraphical ordering $<_l$ is defined such that $A<_lB$ if $(|A|<|B|)$ OR $(|A|=|B|, \exists n|\forall i\leq n\ x_i=y_i, x_{i+1}<_ly_{i+1})$ This ordering has the property that for and A and B either $A<_lB$, $B<_lA$ or $A=B$. The symbol ordering is defined as follows. Let A and B be two symbols. Let the symbol ordering $<_s$ be defined such that $A<_sB$ if (A is a start symbol, B is not a start symbol) OR
(A is a start symbol, B is a start symbol, $A<_lB$) OR
(A is not a start symbol, B is not a start symbol, A is not a terminal, B is a terminal) OR
(A is not a start symbol, B is not a start symbol, A is a terminal, B is a terminal, $A<_lB$) OR
(A is not a start symbol, B is not a start symbol, A is not a terminal, B is not a terminal, $A<_lB$).

The symbol ordering $<_s$ has the property that, given any two terms A and B, either $A<_sB$, $B<_sA$, or $A=B$.

Two non-terminals A and B can only be merged if $A<_sB$ and there exists a term of the form A(x) on either the left hand side or the right hand side of a rewrite rule, and a term B(y) on either the left hand side or the right hand side of a rewrite rule such that there exists a $\sigma$ and $\zeta$ such that $x|-|*_\zeta y^\sigma$. That is, x can be transformed to y via a combination of both unification and reordering.

For instance, if there are two rules "From(?city-)-->from City(?city-)" and "From(?place-)-->from Place(-?place)", then the non-terminals City and Place can be merged. This is because $(?city-)|-|*_\zeta(-?place)^\sigma$ where $\sigma=\{?place\rightarrow?city\}$ and $\zeta(X)=reorder(X, 0, 1)$.

To merge two non-terminals A and B, where $A<_sB$ and there exists a A(x), and B(y) and there exists a $\sigma$ and $\zeta$ such that $x|-|*_\zeta y^\sigma$ using the reordering sequence $\zeta$ firstly all instances of B(x) in either the left hand side or right hand sides of rules are replaced by $A(\zeta(x))$. Secondly, all duplicate rules are deleted. The exact evidence that is used to determine whether two non-terminals should be merged is described below.

The grammatical inference process is described below both formally using an abstract mathematical description, and also with reference to Code Listings 1 to 16 in the Appendix. For clarity, the Code Listings are provided in a JavaScript-like pseudo-code. For example, a pseudo-code listing of the high-level steps of the grammatical inference process is shown in Code Listing 1. The grammatical inference process has the property that if provided with a large enough set of sentences it can learn a class of context-free grammar exactly from positive examples only.

Figure 3:
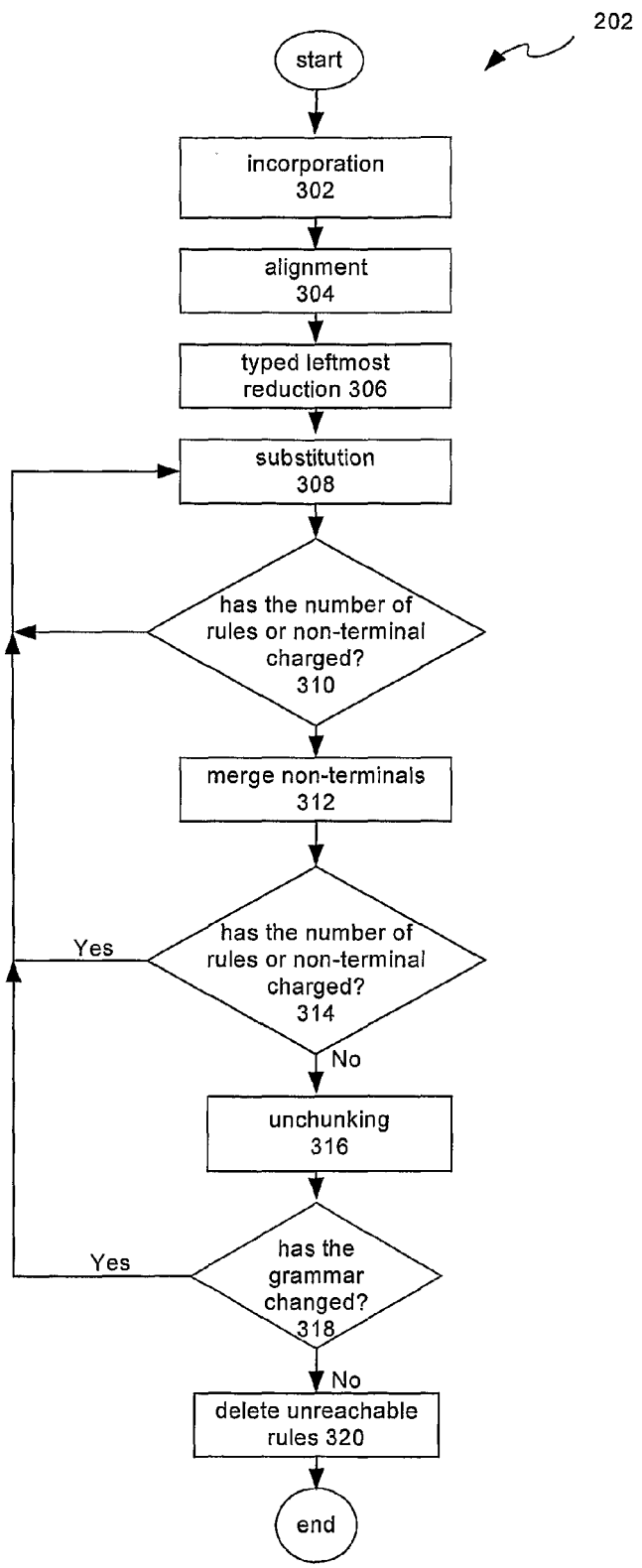
FIG. 3 is a flow diagram of a merging process of the grammatical inference process.

As shown in FIG. 2, the grammatical inference process begins with a merging or left-alignment process 202. As shown in FIG. 3, the merging or left-alignment process 202 begins with an incorporation phase at step 302.

Incorporation Phase

In this step, a starting grammar that generates the training examples exactly is created. That is, for each sentence s that is required to be generated by the non-terminal S, add a rule of the form S(x)-->s.

In Code Listing 1, this step is performed by the function construct_from_examples. If an example phrase "a b c" exists in the training set with attributes $X_1$, a rule of the form "$S(X_2)$->a b c" is created, where $X_2$ is the set of attributes $X_1$ described in signature form.

Alignment Phase

Returning to FIG. 3, at step 304, alignments are used to identify substrings of the training sentences that represent one instantiation of candidate non-terminals in the grammar other than the start symbol (Each of these substrings will form the right hand side of a constituent). Rules that generate these constituents are then generated. These are generated according to the two following rules:

Rule 1: If there exists two rules of the form $S(y_1)$-->c $x_1$ and $S(y_2)$-->c $x_2$ and there does not exist any rules of the form $S(y_3)$-->c $x_1\ x_3$ or $S(y_4)$-->c $x_2\ x_4$, and $|x_1|>0$ and $|x_2|>0$, then two rules are created of the form $X_1(y_5)$-->$x_1$ and $X_2(y_6)$-->$x_2$ such that $val(y_5)=val(y_1)-(val(y_1)\cap val(y_2))$ and $val(y_6)=val(y_2)-(val(y_1)\cap val(y_2))$ and $X_1=X_2$ if and only if $pattern(y_5)=pattern(y_6)$. Similarly, two constituents $(X_1(y_5), x_1)$ and $(X_2(y_6), x_2)$ are created.

Rule 2: If there exists two rules of the form $S(y_7)$-->c $x_7$ and $S(y_8)$-->c $x_7\ X_8\ X_9$ and $val(y_7)\subset val(y_8)$, $|x_7|=1$ and there does not exist any rules of the form $S(y_9)$-->c $x_7\ x_8$ then two rules are created of the form $X_7(y_7)$-->$x_7$ and $X_8(y_8)$-->$x_7\ x_8\ x_9$ such that $val(y_7)=val(y_7)-(val(y_7)\cap val(y_8))$ and $val(y_8)=val(y_7)-(val(y_7)\cap val(y_8))$ and $X_7=X_8$ if and only if $pattern(y_7)=pattern(y_8)$. Similarly two constituents $(X_7(y_7), x_7)$ and $(X_8(y_8), x_7\ x_8\ x_9)$ are created.

The alignment is performed in the function doalign as shown in Code Listing 2. One way to identify candidate constituents is to align each rule with every other rule from the left. However, if this approach was taken and there are N rules then $N\times(N-1)$ comparisons would be required. The function doalign uses a more efficient approach by generating a Prefix Tree Acceptor (PTA). A prefix tree acceptor is a finite state automaton that generates only the strings used to create it in which common prefixes are merged together, resulting in a tree shaped automaton. For example, consider the following three sentences:

```
left left right right
left right
left right left right
```

Figure 5:
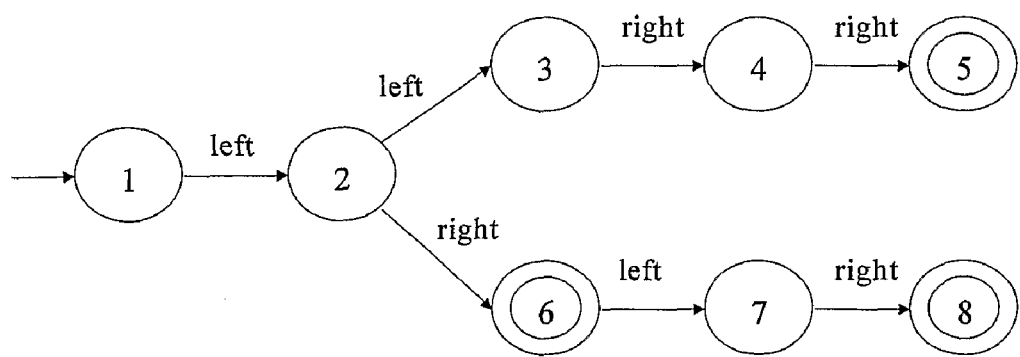
FIGS. 5 and 6 are prefix tree acceptors generated by the grammatical inference system.
Figure 6:
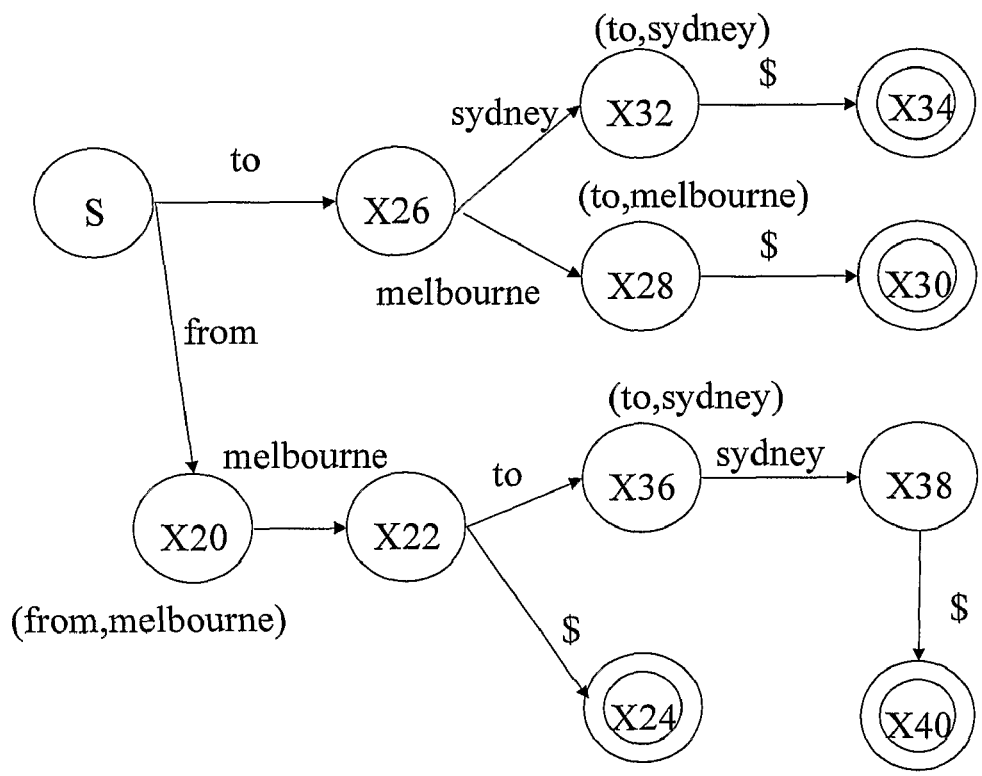

A prefix tree acceptor that generates these three sentences is shown in FIG. 5. Each node in the prefix tree acceptor represents a state. A sentence can be generated from a prefix tree acceptor by a machine as follows. The machine begins in the start state and selects a state transition. For instance, in FIG. 5 it would begin in state 1, from which there is only one allowable transition. When the machine transitions from one state to another it outputs the label attached to the transition. For instance while transitioning from state 1 to state 2, the machine would output the word "left". This is repeated until the machine reaches a terminating state, represented by double circles. In FIG. 6, states 5, 6 and 8 are terminating states. While in a terminating state, a machine can choose to either terminate, or select a transition from that state, if one exists.

For any given prefix of any sentences that can be generated by a prefix tree acceptor, there exists a unique state in the prefix tree acceptor that is used to generate all sentences with that prefix. For instance, in FIG. 5, state 6 is used to generate all sentences that have the prefix "left right". In addition, if the prefix tree acceptor is used to represent sentences for which a set of attributes describing that sentence is known, then the prefix tree acceptor can be used to record those attributes that are common to all sentences that contain that prefix. This can be done using the attribute contribution notation described in Starkie (2000). Using this notation, the attribute contribution a=b denotes that all sentences that share this prefix are represented by a set of attributes that include the attribute a=b. The attribute contribution :x=b denotes that all sentences that share this prefix notation are represented by a set of attributes that include an attribute of type x and value b. In Starkie (2000), this notation *=b is used, however the notation :x=b is preferred because it also retains the type information of attributes.

Once the prefix tree acceptor is created for any given prefix of any given sentence generated by the prefix tree acceptor, the attributes that are common to all sentences that share that prefix can be read straight from the prefix tree acceptor, as follows.

The data structure used to represent a training sentence is shown in Table 1 below.

TABLE 1

| Member | Type | Purpose |
| --- | --- | --- |
| Start_symbol | string | The name of the start symbol that can generate this sentence e.g. S |
| Actual_words | Sequence of words | The actual words of the sentence e.g. I want to fly to perth from sydney |
| Attributes | A set of key value pairs | This data structure represents the meaning of the sentence as a data structure. Eg. to = perth from = sydney |

The function doalign first uses the functions create_typed_prefix_tree_acceptor and add_to_create_typed_prefix_tree_acceptor shown in Code Listing 3, to construct a prefix tree acceptor. Before this is done the symbol "$" is appended to each sentence to represent the end of the sentence. The functions create_typed_prefix_tree_acceptor and add_to_create_typed_prefix tree acceptor use a structure representing a node in a prefix tree acceptor as shown in Table 2 below.

TABLE 2

| Member | Type | Purpose |
| --- | --- | --- |
| Remainder | map<int,PrefixTreeAcceptor> | A reference to the next node in the tree |
| Contributions | a set of attribute contributions | Used to construct signatures for rules created from this node in the PTA. |
| virtual_branch | Boolean | This is set to true when the next symbol can be either an end of string or some other symbol AND the attribute contribution associated with the end of string contains elements in addition to the attribute contributions of the prefix. |
| Sigs | map<Signature,Non-terminal name> | An associative array of non-terminals referenced by a Signature. A signature is a typing mechanism for non-terminals |

The function prune_contributions_all shown in Code Listing 4 is then called. At the completion of this function, the prefix tree acceptor is configured so that, for any attribute of any given sentence, the prefix tree acceptor can be used to determine the shortest prefix of the sentence such that all sentences beginning with that prefix have that attribute. For instance, consider the following three sentences:

from melbourne to sydney {from=melbourne, to =sydney }
from melbourne to perth {from=melbourne, to =perth }
from perth to adelaide {from=perth, to=adelaide }

Consider the sentence "from melbourne to sydney" and the attribute "from=melbourne". The prefix "from Melbourne" is the shortest prefix for which all sentences that include that prefix include the attribute "from=melbourne" in the set of attributes describing that sentence.

The function set_virtual_branch(pta) referenced in Code Listing 4 returns true if and only if ((|pta.remainder|==1) && (|pta.remainder[0].remainder|>1) && (∃n:pta.remainder[n].symbol='$'));

The function possible_contributions performs the following: for every attribute of the form k=v of type t the attribute contributions k=v and :t=v are returned.

Returning to the function doalign in Code Listing 2, the function parseable takes as its arguments a node of a prefix tree acceptor and a string. The function returns true if the sentence can be parsed using the prefix tree acceptor without passing through a terminal state. A terminal state of a prefix tree acceptor is a state in which a sentence can end. If the function parseable returns true, then the function doalign calls the function make_typed_factor_rules to construct the constituents from the prefix tree acceptor.

The function make_typed_factor_rules shown in Code Listing 5 is then called. This function takes as its input a node of a prefix tree acceptor, the suffix of a sentence, and a set of attributes. For each sentence in the set of positive examples, the function is called with the root node of the prefix tree acceptor that has been created by the function create_typed_ prefix_tree_acceptor and the attributes of the given sentence. Given the sentence, the function traverses those nodes of the prefix tree acceptor that would be used to generate the sentence. As the function examines each node of the acceptor, those attributes that are common to all prefixes that are generated by that state are removed from the set of attributes. If there is more than one transition from the node being examined, then it is known that there are at least two sentences generated according to the derivation $S(y_1) \Rightarrow^* c\ x_1$ and $S(y_2) \Rightarrow x_2$, where $c\ x_1$ is the original sentence passed to the function make_typed_factor_rules and c is the prefix represented by that node of the prefix tree acceptor.

Due to the way in which the rules of the hypothesis grammar have been created, there are two rules in the hypothesis grammar of the form $S(y_1) \text{-->} c\ x_1$ and $S(y_2) \text{-->} c\ x_2$. Therefore the function creates a rule of the form $X_1(y_5) \text{-->} x_1$. The function assigns the value of the attribute map passed to after subtracting from it the attributes that are common to all sentences that share the common prefix; that is, $val(y_5) = val(y_1) - (val(y_1) \cap val(y_2))$. Similarly, when the function is passed the example sentence $c\ x_2$ when examining this node of the prefix tree the function creates the rule $S(y_4) \text{-->} c\ x_2\ x_4$, where $val(y_6) = val(y_2) - (val(y_1) \cap val(y_2))$. In addition, the value of $X_1$ and $X_2$ are dependent upon the node of the prefix tree and pattern ($y_5$) and pattern ($y_6$) respectively. Therefore it can be seen that $X_1 = X_2$ if and only if $pattern(y_5) = pattern(y_6)$. Therefore the function make_typed_factor_rules implements rule 1 of the alignment phase.

Similarly, the function make_typed_factor_rules also creates a constituent when there is only one transition out of the current node, but the next node includes a transition that accepts the symbol representing the end of a sentence "$" and the node representing the end of sentence has some attributes attached to it. This only occurs when there exists two sentences of the form $S(y_7) \Rightarrow^* c\ x_7$ and $S(y_8) \Rightarrow^* c\ x_7\ x_8\ x_9$ and $val(y_7) \subset val(y_8)$, $|x_7|1=1$ and there does not exist any rule of the form $S(y_9) \text{-->} c\ x_7\ x_8$ where c is the prefix represented by that node of the prefix tree acceptor and $c\ x_7$ is the sentence passed to the function make_typed_factor_rules. In this case, a rule is created of the form $X_7(y_7) \text{-->} X_7$ such that $val(y_7) = val(y_7) - (val(y_7) \cap val(y_8))$. Similarly, when the function is passed the sentence, a rule of the form $X_8(y_8) \Rightarrow^* x_7\ x_8\ x_9$ is created such that $val(y_8) = val(y_7) - (val(y_7) \cap val(y_8))$. In addition, $X_7 = X_8$ if and only if $pattern(y_7) = pattern(y_8)$. It can therefore be seen that the function also implements rule 2 of the alignment phase.

In this embodiment constituents and rules are stored using the same data structures, which is consistent with the fact that a rule is just a specialised form of a constituent. It can be seen in code listing 1 that the constituents are initially set to the value of the starting hypothesis grammar just prior to the beginning of the substitution phase.

Three different examples are described below to illustrate the alignment step 304. The first example involves the behaviour of the grammatical inference process when presented with the following training examples:

```
"from melbourne" { from=melbourne}
"to melbourne" { to=melbourne}
"to sydney" { to=sydney}
"from melbourne to sydney" { to=sydney from=melbourne}
```

When presented with these examples, the doalign function generates the prefix tree acceptor shown in FIG. 6 which is described by the following textual notation:

```
{S
  {X21 to
    {X24 sydney{X25  }}        to=sydney *=sydney
    {X22 melbourne{X23  }}     to=melbourne *=melbourne
  }
  {X18 from {X19 melbourne    from=melbourne *=melbourne
    {X26 to{X27 sydney{X28   }}}   to=sydney *=sydney
    {X20 }
  }}             from=melbourne *=melbourne
}
```

From this prefix tree acceptor, the following rules are generated:

```
S(- melbourne ) → from melbourne
S(melbourne - ) → to melbourne
S(sydney - ) → to sydney
S(sydney melbourne ) → from melbourne to sydney
X29(- melbourne ) → melbourne
X30(melbourne - ) → melbourne
X30(sydney - ) → sydney
X31(sydney melbourne ) → melbourne to sydney
X32(Sydney - ) → to sydney
```

As a second example, consider the scenario where the following three sentences are provided:

```
i own a golf { thing ="golf"}
i own a golf club { thing ="golf club"}
i own a golf club membership { thing ="golf club membership"}
```

In this case, the doalign function constructs the following textual prefix tree acceptor:

```
{X26 i{X27 own{X28 a {X29 golf
    {X31 club
      {X33 membership{X34  }}       thinG ="golf
      club membership" *="golf club membership"
                    {X32  }     thinG ="golf club" *="golf club"}
         {X30  }     thinG ="golf" *="golf"
}}}}
```

From this prefix tree acceptor, the following rewrite rules are constructed:

```
S("golf club membership" ) → i own a golf club membership
S("golf club" ) → i own a golf club
S("golf" ) → i own a golf
X35("golf club membership" ) → golf club membership
X35("golf club" ) → golf club
X35("golf" ) → golf
X36("golf club membership" ) → club membership
X36("golf club" ) → club
X37("golf club membership" ) → membership
```

As a third example, consider the case where the following example sentences are provided:

```
ten past two { hours.digit0=2 minutes.digit1=1} ,
ten past three { hours.digit0=3 minutes.digit1=1} ,
five past two { hours.digit0=2 minutes.digit0=5} ,
```

-continued

```
five past three { hours.digit0=3 minutes.digit0=5 } ,
ten to two { hours.digit0=1 minutes.digit1=5 } ,
ten to three { hours.digit0=2 minutes.digit1=5 } ,
five to two { hours.digit0=1 minutes.digit0=5 minutes.digit1=5 } ,
five to three { hours.digit0=2 minutes.digit0=5 minutes.digit1=5 }
```

In this case, the following textual prefix tree acceptor is generated:

```
{S
    {X26 ten
        {X38 to           minutes.digit1=5 *=5
            {X39 two{X40   }}        hours.digit0=1 *=1
            {X41 three{X42 }}        hours.digit0=2 *=2
        }   minutes.digit1=5 *=5
        {X27 past minutes.digit1=1 *=1
            {X28 two{X29 }}          hours.digit0=2 *=2
            {X30 three{X31 }}        hours.digit0=3 *=3
        }   minutes.digit1=1 *=1
    }
    {X32 five         minutes.digit0=5 *=5
        {X43 to           minutes.digit1=5
            {X44 two{X45  }}         hours.digit0=1 *=1
            {X46 three{X47 }}        hours.digit0=2 *=2
        }   minutes.digit1=5
        {X33 past
            {X34 two{X35 }}          hours.digit0=2 *=2
            {X36 three{X37 }}        hours.digit0=3 *=3
        }
    }     minutes.digit0=5 *=5
}
```

From this prefix tree acceptor, the following rules are generated:

```
S(1 - 5)  → ten to two
S(1 5 5)  → five to two
S(2 - 1)  → ten past two
S(2 - 5)  → ten to three
S(2 5 -)  → five past two
S(2 5 5)  → five to three
S(3 - 1)  → ten past three
S(3 5 -)  → five past three
X48(1 - 5) → to two
X48(2 - 1) → past two
X48(2 - 5) → to three
X48(3 - 1) → past three
X49(2 - -) → two
X49(3 - -) → three
X50(2 - -) → past two
X50(3 - -) → past three
X51(2 - -) → two
X51(3 - -) → three
X52(1 - -) → two
X52(2 - -) → three
X53(1 - 5) → to two
X53(2 - 5) → to three
X54(1 - -) → two
X54(2 - -) → three
```

Substitution Phase

Step 304 ensures that no two rules exist of the form $X_9(y_9)$-->A B C and $X_{10}(y_{10})$-->B and const $(y_{10}) \subset$ const $(y_9)$. This is achieved by reducing the right hand side of each rule by all other rules where possible in a left to right fashion. Specifically, if there exists two rules of the form $X_9(y_9)$-->$A_1$ $B_1$ $C_1$ and $X_{10}(y_{10})$-->$B_2$, such that const $(y_{10}) \subset$ const $(y_9)$, $B_2$ unifies with $B_1$ using the mapping σ, $|A_1 C_1|>0$ and there does not exist a rule of the form $X_{11}(y_{11})$-->$B_3$ such that const $(y_{11}) \subset$ const $(y_9)$, $A_1 B_1 C_1 = A_4 B_4 C_4$, $B_4$ unifies with $B_3$ using the mapping σ2 and $A_4 B_4$ is a proper prefix of $A_1 B_1$ then the rule $X_9(y_9)$-->A B C is reduced to become $X_9(y_9)$--> $A_4 X_{11}(y_{11})^{σ2} C_4$.

This special case of reduction is referred to as a typed_leftmost reduction and the notation $A_{TL} \Leftarrow B$ is used to denote that A can be reduced to B via a single step typed_leftmost reduction. Similarly, the notation $A_{TL} \Leftarrow *B$ is used to denote that A can be reduced to B via zero or more single step typed_leftmost reductions. It can be shown that if the right hand sides of all rules are unique up to the renaming of variables in signatures, then given a grammar and sequence of terms A, there is only one irreducible sequence of terms B such that $A_{TL} \Leftarrow *B$.

Figure 4:
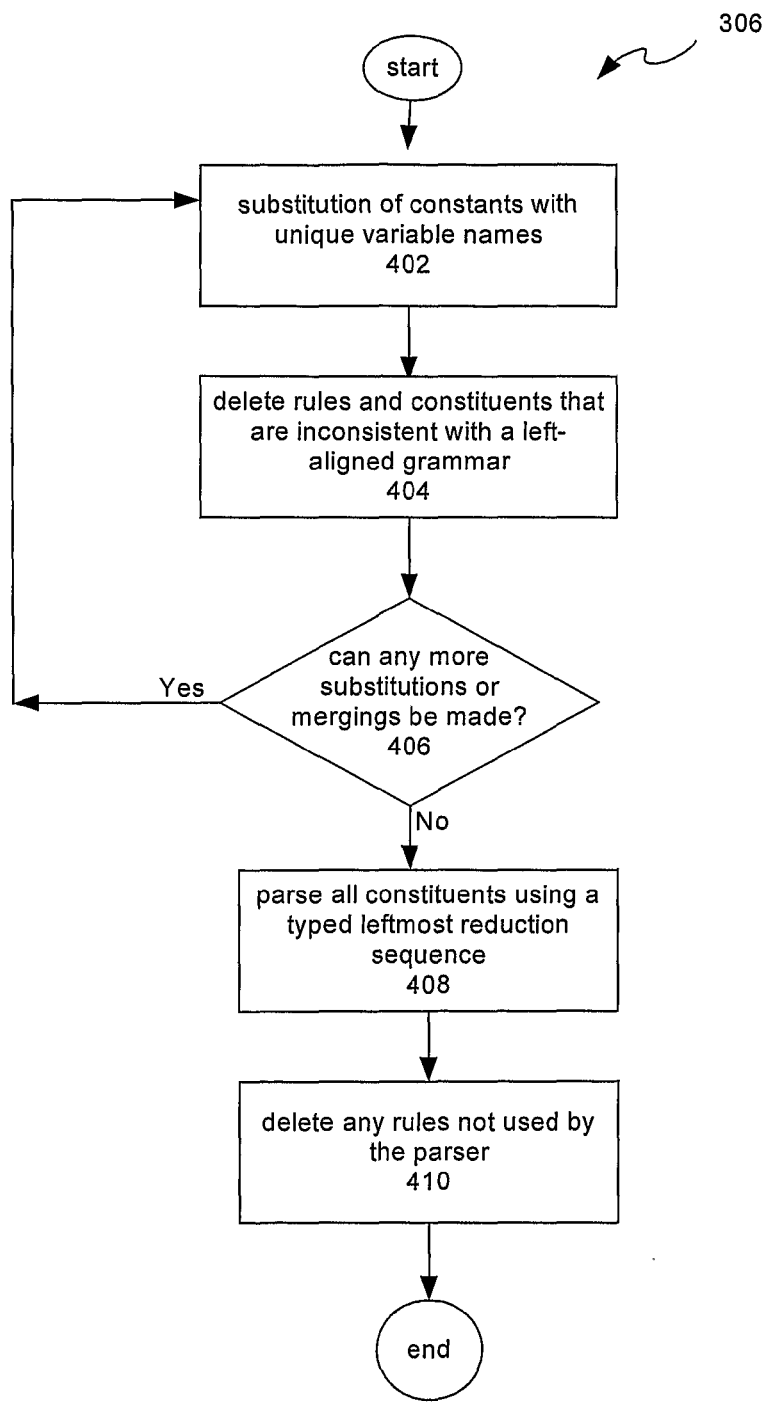
FIG. 4 is a flow diagram of a typed leftmost reduction process of the merging process.

At step 308, a substitution process is executed, as shown in FIG. 4. If a rule of the form A(x)-->B exists such that it's right hand side is irreducible and contains constants in the signature of its non-terminals, then a substitution σ3 is created at step 402 to replace all constants with unique variable names. Specifically, σ3={i→?n|i∈const(B), there does not exist a j|(j→?n)∈σ3}. The substitution is then applied to both the left and right hand side of the rule to ensure that no constants appear on the right hand side of a rule. i.e. $A(x)^{σ3}$-->$B^{σ3}$.

At step 404, rules and constituents are deleted that cannot exist if the target grammar is a left aligned grammar. Specifically:
(i) All rules of the form A(x)-->A(y) B where A is not a start symbol are deleted.
(ii) Similarly, all constituents of the form (A(x),C) are deleted if A(x)⇒*A(y) B⇒*C, where A is not a start symbol. This condition can be detected by reducing C until either it is irreducible or it is reduced to be A(y) B for some value of y and B.
(iii) All rules of the form A(x)-->B where val(x)≠val(B) are deleted. The way in which rules are created ensures that if the val(A(x))≠val(B) then some variable occurs more often in val(B) than in val(x).
(iv) If (A(x), B) is a constituent and $B \Leftarrow *C(x)$, and there exists a σ such that $A(x) |-|*_{ςC(y)}^{σ}$, then A and C are merged using the reordering sequence ζ in both the grammar and the set of constituents.
(i) Duplicate rules are then deleted.

The substitution phase is repeated via step 406 until no more substitutions or mergings can be made.

At step 408, all constituents are parsed using a typed leftmost reduction sequence. Rules that are not used during this process are deleted at step 410, thus completing the substitution process 308.

Returning to FIG. 3, if the number of rules or non-terminals has changed then the substitution process is repeated via step 310. Otherwise, the substitution phase ends.

Merging Phase

The typed_leftmost reduction step 306 is based on the function typed_left_most(A,G,S), as shown in Code Listing 6. When presented with a unification grammar G and a sequence of terms A, and an unordered list of values this function returns a typed_leftmost reduction.

The function typed_leftmost first pushes the terms from the sequence being reduced with meaning represented by the signature z, one term at a time in a left to right fashion. After a symbol 'a' is pushed onto the stack, the grammar is examined to see if there is a rule of the form 'X(y)->a', where const(y) ⊂ const(z). If there is such a rule then the symbol 'a' is reduced to the symbol 'X(y)'.

The last N terms on the stack $(S(m_{x-n})_{x-n} \ldots S_x(m_x)_x)$ are then compared to the rules of the grammar to see if a rule of the form $Y(w)$-->$S(n_{x-n})_{x-n} \ldots S(n_x)_x$ exists such $(S (n_{x-n})_{x-n} \ldots S(n_x)_x)^ς = (S(m_{x-n})_{x-n} \ldots S_x(m_x)_x)$ for some ζ. If such a rule exists, then the lastN symbols on the stack are replaced by the nonterminal Y(w)$^c$. The rules of the grammar are then examined once again to see if a rule can be used to reduce the last N terms on the stack to a non-terminal. If no further reduce operations can be applied to the stack, then another term is shifted onto the stack.

It should be noted that the typed_leftmost function performs all possible reductions before it will shift anything onto the stack. This ensures that the sequence returned by the function is a typed leftmost reduction.

The typed leftmost reduction step 306 is actually performed by the function normalise(G) as shown in Code Listing 7, which takes as its input a unification grammar, and uses the function typed_leftmost reduce the right hand side of all rules using the rule right hand side of all other rules.

The normalize(a) function successfully applies the function typed_leftmost such that at its completion the right hand side of each rule cannot be reduced further using the function typed_leftmost with the exception of the case where one non-terminal can be reduced to another non-terminal. This function also deletes rules that would result in a non-terminal other than a start symbol containing left recursion, as described below. The function also uses the function generalize to generalise the signatures on both sides of the rule in order to ensure that no non-terminals have constants in their signatures. For instance, the rule "From(melbourne)-->from City(melbourne)" would be generalized to become "From (?x)-->from City(?x)", where x is a variable name.

It can be shown that for every left aligned grammar there is a set of example sentences known as a characteristic set that can be generated from the grammar such that when these sentences are presented to the grammatical inference process the grammatical inference process will reconstruct the grammar exactly. It can be shown that when such a characteristic set is presented to the process, the grammar would be reconstructed after the substitution phase, provided that the function normalise is successfully run until the grammar does not change. For each rule in the target grammar, a characteristic set includes at least one sentence that uses that rule. However, it is not guaranteed that any set of sentences generated from a left aligned grammar such that for each rule in the grammar there is one sentence in the set that uses that rule, is always a characteristic set. The reason for this is that for some sets of sentences the order in which the right hand sides of rules are reduced affects the resulting grammar. To overcome this, the function dosubstitute is provided, as shown in Code Listing 8. This function takes as its input both a grammar and a set of constituents. Its function is very similar to the function normalise, with the following important difference. Once the right hand sides of all rules cannot be reduced any further, the function checks to see that all right hand sides B of all constituents of the form (A(x),B) can be reduced using the reduced grammar and the function typed_leftmost to the term A(x). If any constituent cannot be reduced this way, a rule is added of the form A(x)-->C, where C is the sequence of terms returned by the function typed_leftmost. This continues until all constituents can be reduced correctly. This function can be proven to guarantee to terminate. This function also calls the function normalise within each iteration so as to reduce the time taken for this function to execute.

Although the function dosubstitute can transform any unification grammar to a unification grammar that can generate a given set of constituents, such that any subsequence of the right hand side of any rule cannot be parsed using any other rule, when this function is presented with a characteristic set, it may require more than one iteration before it infers the target grammar exactly. Given a set of constituents C and a grammar G such that for every constituent in C of the form (A(x),B) there is a rule in G of the form A(x)-->B, the function crude_sub, as shown in Code Listing 9, returns a unification grammar such that no substring of the right hand side of any rule can be parsed using any other rule. When C is the characteristic set of a left aligned grammar, this function returns the target grammar in one iteration. If C is not a characteristic set however, it returns a grammar that can still be used as a starting grammar to the function dosubstitute, and the resulting grammar returned by the function dosubstitute would be the same as if it was presented with the input grammar to crude_sub.

The function crude_sub uses the function crude_reduce, as shown in Code Listing 10. The function crude_reduce is similar to the function typed_leftmost in that it reduces the term sequence left to right using a stack until no more reductions can be made. In contrast to the function typed_leftmost however, the function crude_reduce finds the longest rule that can be applied, rather than the shortest rule that can be applied. In addition, the function crude_reduce matches the right hand side of a rewrite rule against both symbols on the stack and symbols that are yet to be put on the stack.

The next step 408 in the substitution phase is to parse all constituents using the hypothesis grammar and the function typed_leftmost. An associative array used is constructed that maps a rewrite rule to a Boolean. By default, the array returns false. For each constituent of the form (A(x),B), the sequence B is parsed using the function typed_leftmost. As shown in Code Listing 6, a side effect of this function is that at the completion of the function the global variable rules_used contains the list of rewrite rules used in the reduction sequence. If the result returned by typed_leftmost=A(x), then for each rule R in the set rules_used, the value of used[R] is set to true. Once all constituents are parsed, if there exists a rewrite rule $R_2$ in the grammar hypothesis, such that used[R]= false, then $R_2$ is deleted. This represents step 410 of the substitution process.

Returning to FIG. 3, at the completion of the substitution process non-terminals are merged at step 312 by applying the following rules:
(i) If A(x)⇒*B C(y), A(q)⇒*B D(z), y|-|*$_ζ$z° then C and D are merged using ζ.
(ii) If A(x)⇒*B, C(y)⇒*B, x|-|*$_ς$y°, then A and B are merged using ς
(iii) If A(x)⇒*$Ω_1Ω_2 \ldots Ω_n$ and A(y)⇒*$Ψ_1Ψ_2 \ldots Ψ_n$ and ∀i root($Ω_i$)=root($Ψ_i$) and there exists a σ1|A(y)$^{σ1}$=A(x), $(Ψ_1Ψ_2 \ldots Ψ_n)^{σ1}=(Ω_1Ω_2 \ldots Ω_n)$ and there does not exist a σ2|A(x)$^{σ2}$=A(y), $(Ω_1Ω_2 \ldots Ω_n)^{σ2}=(Ψ_1Ψ_2 \ldots Ψ_n)$, then the rule "A(x)⇒$Ω_1Ω_2 \ldots Ω_n$" is deleted.

For instance, if a grammar contains two rules of the form "S(?from ?to)-->from City(?from-) to City(-?to)" and "S(?from ?from)-->from City(?from-) to City(-?from)", then the rule "S(?from ?from)-->from City(?from-) to City(-?from)" is deleted. This is because every sentence that can be generated by this rule can be generated from the other rule, although the converse is not true.

The merging phase continues until no more non-terminals can be merged. Once the merging phase has completed, if the number of rules or the number of non-terminals has changed, then the substitution phase is repeated via step 314, otherwise an unchunking step 316 is executed, as described below.

The merging phase is implemented by iterating through the rules to see if one of the three rules (I) to (ii) above can be applied. In an alternative embodiment a set of rules is created, and every rule is placed in the set. As each rule is investigated, it is removed from the set. When the non-terminals A and B are merged, all rules that contain either A or B on either their left or right hand sides are put into the set if they do not already exist in the set. In addition if a rule is deleted it is removed from the set of rules. This alternative embodiment reduces the number of times a rewrite rule is compared to the three transformation rules described above.

Unchunking Phase

The unchunking step 314 is performed as follows. If there exists a non-terminal A in the grammar where A is not the start symbol such that there is only one rule of the form A(x)-->B, then for all instances of A(y) on the right hand side of any other rule $R_1$ i.e. $R_1$=C(z)-->D A(y) E, a substitution σ is found such that $A(x)^\sigma$=A(y), and $R_1$ is transformed to become C(z)-->D B° E. The rule A(x)-->B is then deleted all constituents of the form (A(y),F) are deleted. This is performed by iterating through all rules to see if a rule exists of the form A(x)-->B where there is no other rule that begins with the non-terminal A, and A is not the start symbol.

The unchunking is continued until no more changes can be made. If at step 318, it is determined that the grammar has changed during the unchunking step 316 then the left-alignment process returns to the substitution phase.

Final Stage

Rules that are unreachable from the start symbol are deleted at step 320, as described in Aho, A. V. and J. D. Ullman (1972), *The theory of parsing, translation, and compiling*, Englewood Cliffs, N.J., Prentice-Hall.

It will be apparent to those skilled in the art that a variety of modifications can be made to the grammatical inference process described above. For instance, the substitution, merging and unchunking phases can be implemented concurrently as the order of these single step transformations does not affect the inferred grammar when presented with a supercharacteristic set. These steps are presented as separate sequential steps in the description above, because there exists some implementations of the above process in which additional steps are implemented that ensures that the process will infer the exact grammar that can generate the training examples even when the training examples do not form a supercharacteristic set.

For instance, consider the following grammar:

```
%slots {
}
S --> X c
X --> A b
X --> x
A --> a
A --> z
Y --> b c
Y --> y
S --> q X
S --> m Y
S --> n A
```

A characteristic set of this grammar is the following set of sentences:

```
{ "x c",
  "q x",
  "q a b",
  "n a",
  "n z",
  "m b c",
  "my" }
```

If these sentences are aligned according to the left alignment process, the following constituents are generated:

```
(S,x c)
(S,q x)
(S,q a b)
(S,n z)
(S,n a)
(S,m y)
(S,m b c)
(A,z)
(A,a)
(Y,y)
(Y,b c)
(X,x)
(X,a b)
```

These constituents have the property that the order that the right hand sides of the constituents are reduced, as the reduction will always generate the same set of reduced constituents which corresponds to the rule of the grammar from which it was created.

It can be shown that there exists a process that can be applied to any left-aligned grammar such that it creates a characteristic set of sentences, from which a set of constituents can be created via alignment such that when each one is reduced using a typed leftmost reduction, the original grammar is produced. This process is not described further herein, but it forms part of the proof that left-aligned grammars can be inferred in the limit using the left aligned algorithm. When presented with any set of sentences produced from the grammar and this set, the left alignment or merging process 202 infers the grammar exactly after the first iteration of the function crude_sub. Even if the function crude_sub was omitted, the function will be successfully recreated using the function dosubstitute. Even if the function dosubstitute was replaced with a call to the function normalise, the grammar would still be inferred correctly. This is case for any supercharacteristic set of any left-aligned grammar. Therefore alternative embodiments of the merging algorithm can omit the function crude_sub and replace function dosubstitute with the function normalise. Further alternative embodiments can include the function crude_sub but omit the function dosubstitute. In such embodiments, there is no need to keep a reference to the constituents at all. These embodiments would still be able to infer left-aligned grammars exactly from a supercharacteristic set, but for some left-aligned grammars there would be sets of training sentences for which the first and second preferred embodiments described herein would learn the target grammar exactly but these simplified alternative embodiments may not.

Consider for example the following set of sentences generated from the same grammar as the previous example:

```
{ "z b c",
  "q x",
  "q a b",
  "n a",
  "n z",
  "m b c",
  "my" }
```

It can be shown that this set of sentences is not a characteristic set, but it does have the property that for every rule in the grammar there is at least one sentence in the set of training examples that is derived from that rule. If these sentences are aligned according to the left alignment or merging process 202, the following constituents are created:

```
(S,z b c)
(S,q x)
(S,q a b)
(S,n z)
(S,n a)
(S,m y)
(S,m b c)
(A,z)
(A,a)
(Y,y)
(Y,b c)
(X,x)
(X,a b)
```

If the typed leftmost reduction of "z bc" is generated using this set of constituents, the result is "z Y" which is wrong because the constituent (S,z b c) is derived using the derivation S⇒X c⇒z Y. In the first and second preferred embodiments described herein however when the function dosubstitute is called with the rules S-->z Y, A-->z and X-->A b (which correspond to a subset of the typed leftmost reductions of the constituents created by alignment) and the constituent (S,z b c), the rule S-->X c is created. Therefore these preferred embodiments of the merging process will learn the grammar exactly from this training set.

Finally, yet further alternative embodiments can omit the step where the constituents are parsed using the rewrite rules.

Figure 7:
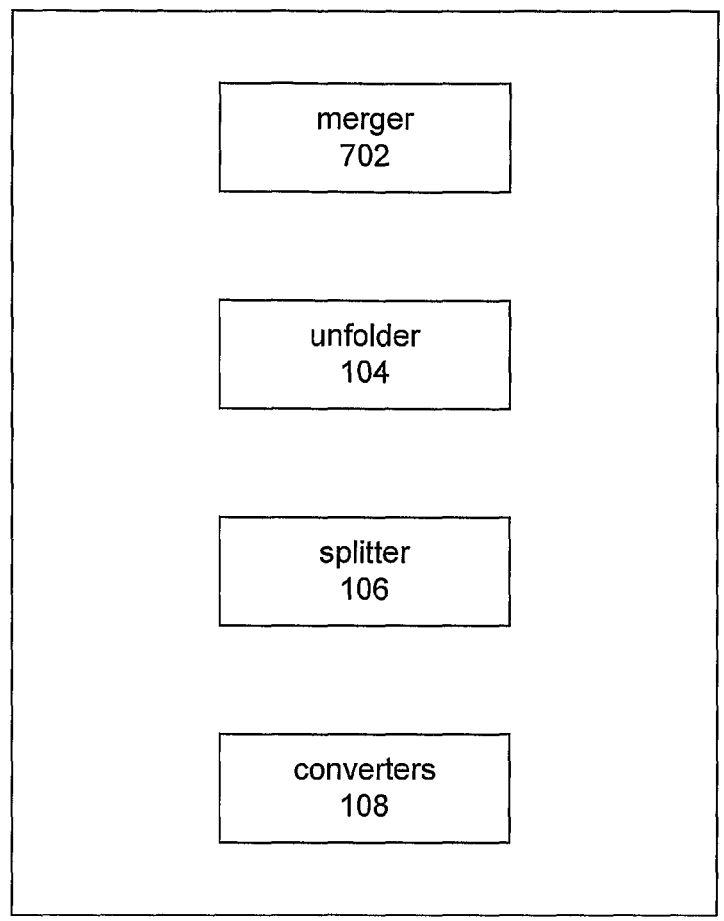
FIG. 7 is a block diagram of a second preferred embodiment of a grammatical inference system.
Figure 8:
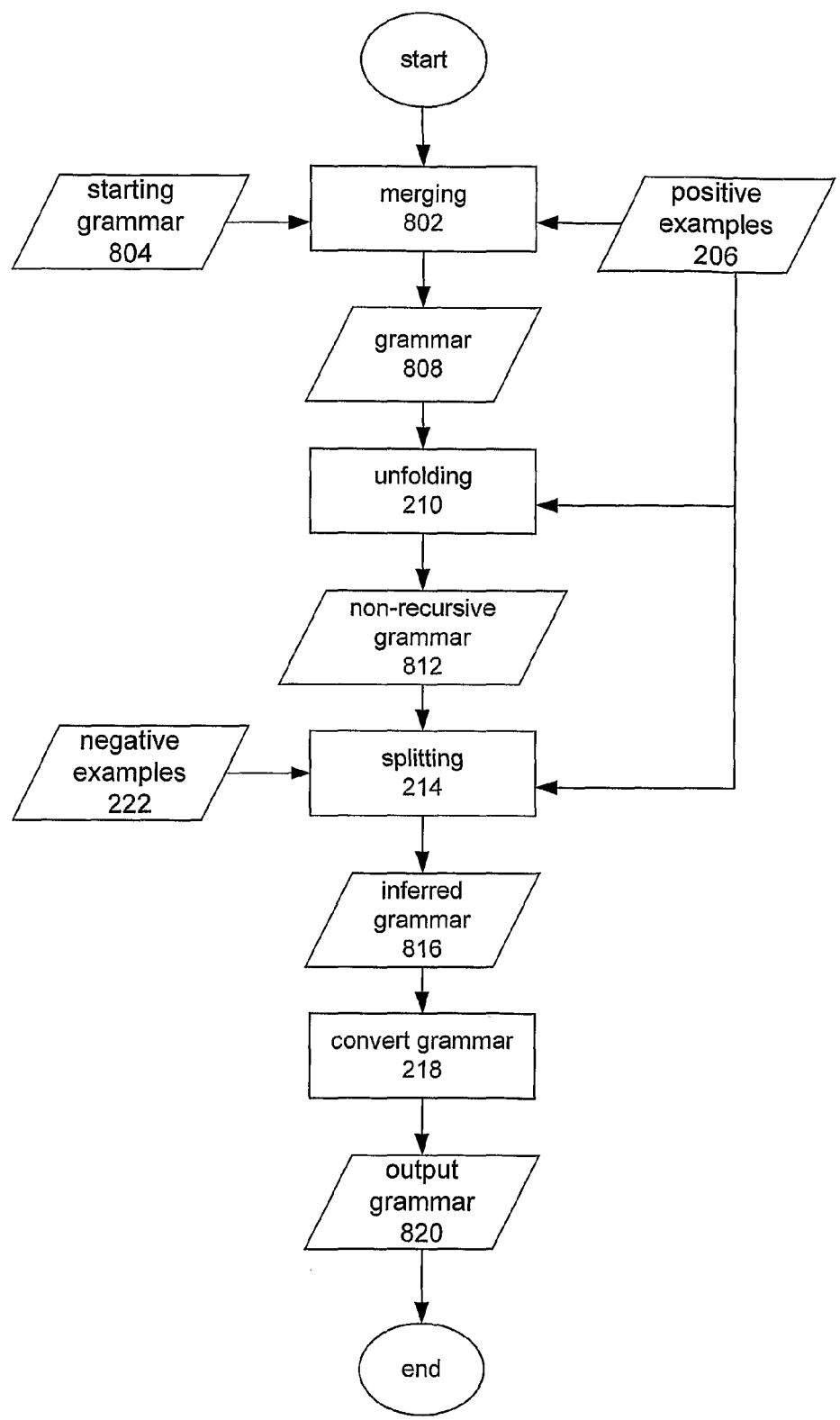
FIG. 8 is a flow diagram of a grammatical inference process executed by the grammatical inference system of the second preferred embodiment.

The first preferred embodiment of the grammatical inference process described above does not allow a starting grammar to be defined and has only one start symbol. In a second preferred embodiment, as shown in FIGS. 7 and 8, a grammatical inference system includes a merging component 702 that executes a merging process 802 that can accommodate a starting grammar 804 and can infer a grammar that includes more than one start symbol. The ability to include a starting grammar is advantageous because this can significantly reduce the amount of training examples that the grammatical inference requires to learn the target grammar. Starkie (2000) describes a process by which a starting grammar can be created for a dialog application using a high level description of the tasks to be performed by the application. The processes described herein can be used as a replacement for the grammatical inference process described in Starkie (2000) and when used as such, the ability to include starting grammars is a prerequisite.

If the merging process is to accommodate a starting grammar, it is desirable that it should be able to accommodate any starting grammar, not just left aligned grammars, or portions of left aligned grammars. The second preferred embodiment described below includes a merging process 802 that can accommodate any starting grammar 804. In dialog systems it is often the case that there are separate grammars for separate states of the dialog, and thus it is advantageous for the merging process 802 to learn multiple grammars at once.

The starting grammar 204 is read from a file or otherwise provided on a computer readable storage medium. This grammar 204 may have been created using the templating process described in Starkie (2000). Alternatively, it may be the output of a previous application of the grammatical inference system, or a hand coded grammar, or any suitable grammar. The format of the starting grammar 204 is the same format used for the grammars generated by the grammatical inference system and described above.

For the sake of brevity, this second preferred embodiment is described below only in so far as it differs from the first preferred embodiment described above. In summary, the main differences are:

(i) In the Incorporation Phase, starting rules are created by partially parsing the positive examples bottom-up left to right using a chart parser.

(ii) Constituents of the form (A(x),B) can include non-terminals in the sequence B.

(iii) The functions used during the alignment phase need to be modified to accommodate the fact that constituents can include non-terminals.

(iv) The functions used during the substitution phase need to be modified to accommodate the fact that rules of the form .A(x)-->B(X) can exist in the grammar.

The second preferred embodiment of the merging process 802 is shown in pseudo-code in Code Listing 11. It can be seen that this embodiment shares a large number of functions in common with the first embodiment shown in Code Listing 1. The only differences are:

(i) The function incorporate_positive_examples is used in the second embodiment in place of the function construct_from_examples.

(ii) In addition to constituents created from the positive examples and constituents created by alignment some rules contained in the starting grammar become constituents.

(iii) An alternative implementation of the function make_typed_factor_rules is required for the second embodiment.

These differences are described below in more detail.

Incorporation Phase

It will be apparent that the notation for unification grammars used in the described embodiments includes the ability to prefix rewrite rules in the grammar with either a single exclamation mark "!" or a double exclamation mark "!!". These prefixes are added to the grammar to enable starting grammars to include directions on the way in which the starting grammars are used.

If a rewrite rule is prefixed by a single exclamation mark; e.g., "!City(perth)-->perth", then this rule should not be deleted or altered by the merging process. These rules are referred to as fixed rules.

If a rewrite rule is prefixed by a double exclamation mark; e.g., "!!THE->the", then this rule will be referred to as an unchunkable rule. An unchunkable rule is also a fixed rule and therefore cannot be modified or deleted by the merging process. The starting grammar can also include rules that are not prefixed with any exclamation marks. These rules can be modified and deleted by the merging process.

The incorporation phase of the second embodiment ensures that at the completion of the incorporation phase if there exists an example phrase "d" in the training set with attributes $y_9$, then at the completion of the incorporation phase $S(y_9) \Rightarrow *b$. In addition, it ensures that, for all rules created during the incorporation phase of the form $S(y_9)$-->A B C there is no rule of the form $X_{10}(y_{10})$-->B and const $(y_{10}) \subset$ const $(y_9)$ in the grammar at the end of the incorporation phase unless the rule $X_{10}(y_{10})$-->B is unchunkable.

This is achieved by partially parsing the training sentences bottom up left to right using a chart parser. If an example phrase "a b c" exists in the training set with attributes $y_9$ and there exists an edge on the chart that states that there exists a constituent of the form $X_{10}(y_{10})=\Rightarrow B \Rightarrow *b$ such that const $(y_{10}) \subset$ const $(y_9)$, then under certain circumstances (as shown in Code Listing 13), the sequence b is reduced to become $X_{11}(y_{11})^{o2}$ and a rule is created of the form $S(y_9)$--> $A_4 X_{11}(y_{11})^{o2} C_4$. If the rule "$X_{10}(z)$-->B" is an unchunkable rule, then the constituent $X_{10}(y_{10}) \Rightarrow B \Rightarrow *b$ is ignored during the partial parsing process. However, if the rule is not an unchunkable rule and $X_{10}(y_{10}) \Rightarrow B \Rightarrow A\ D(d) \Rightarrow A\ F \Rightarrow *b$, where the rule D(d)-->F is unchunkable, then the edge representing the constituent $X_{10}(y_{10}) \Rightarrow *b$ is not ruled out as a candidate for partial parsing based upon the use of the rule D(d)-->F. For instance, if a starting grammar included the rules:

!Date(?day ?month ?year) --> THE Day(?day - - ) of Month(- ?month -) Year(- - ?year)
!!THE --> the
!!THE --> this then the sentence "on the third of may" with attributes represented by the signature (3 may-) would be reduced to "on Date (3 may-)", but the sequence "the cat sat on the mat" would not be reduced to "THE cat sat on THE mat" due to the fact that the rule "!!THE-->the" is unchunkable.

In addition, if the starting grammar contains more than one start symbol, then if X is a start symbol, all rules of the form "X(x)-->Y" are considered to be unchunkable for the purposes of partial parsing.

The function incorporate_positive_examples shown in Code Listing 12 provides a more detailed description of the incorporation phase of the second embodiment of the merging process.

The function incorporate_positive_examples uses the function make_rules(positive_examples). This function has the following behaviour. First, a set of all attributes in the training examples are collected. Then, for every key value pair in this set, the function make_rule(attribute) is called. The function make_rule makes zero or more guesses at the rules that may exist in the target grammar, solely by looking at an attribute. For instance, if the function is passed the attribute city-Melbourne, it will create a rewrite rule similar to the rule City("melbourne")-->Melbourne, but with a signature consistent with the signature definition of the grammar that the rewrite rule is added to. These rules are not added if a similar rule already exists, and are deleted during the substitution phase if they are reference by any rule at the end of the substitution phase.

The function may also create rules that spell out the values of the attribute for instance when presented with the attribute stock=amp it would create a rule similar to "Stock(amp)-->a m p" in addition to the rule "Stock(amp)-->amp". The function is also aware of the way in structured data is represented as a set of attributes. Therefore, when presented with the attribute date.month="January", it will create a rule of the form "Month("january")-->january" rather than a rule of the form "Date.Month("january")-->january".

The function incorporate is shown in Code Listing 13. Note that, in this embodiment, rewrite rules are not generalise during the incorporation phase but rather are generalised at the end of the alignment phase. In addition, all rules that exist in the starting grammar that are not fixed are added as both constituents and rules in the grammar. These rules can be modified or reduced by the merging process. At the end of the execution of the merging process, the fixed rules are added to the inferred grammar.

Alignment Phase

In this embodiment, the function make_typed_factor_rules that is called by the function doalign during the alignment phase requires one small modification to accommodate the fact that constituents can include non-terminals. In the first embodiment, when the two rules $X_1(y_5) \text{-->} x_1$ and $X_2(y_6) \text{-->}$ $x_2$ are created by aligning the sentences $S(y_1) \text{-->} c\ x_1$ and $S(y_2) \text{-->} c\ x_2$, the signatures are created as follows:

$$val(y_5) = val(y_1) - (val(y_1) \cap val(y_2))$$

$$val(y_6) = val(y_2) - (val(y_1) \cap val(y_2))$$

In the function make_typed_factor_rules, this was implemented in the expression xmap=xmap−common_attributes. When two sequences are aligned that may include non-terminals, this can result in the creation of rules where there are values on the right hand side that are not on the left hand side. To overcome this problem, in the second embodiment, before the rule is created in the function make_typed_factor_rules if the right hand side of the rule contains attributes that do not appear in the signature, additional attributes are added to the rule. In addition, at the end of the alignment phase, all rules have to be generalised, before progressing to the substitution phase. Also, if more than one start symbol exists in the grammar, then a start symbol cannot be merged with any other non-terminal. In all other respects, the implementation of the alignment phase in the two embodiments are the same.

As an example, consider the following two sentences:

"i want to fly to melbourne" { city=melbourne },
"i want to fly on monday to melbourne" { day=monday city=melbourne}

Consider the case where these two sentences are presented to the second embodiment along with the following starting grammar:

%slots {
day day
city city
}
City(- perth ) --> perth
City(- melbourne ) --> melbourne
Day(monday - ) --> monday
Day(friday - ) --> Friday After the incorporation phase the following rules are created:

S(monday melbourne ) --> i want to fly on Day(monday - ) to City(- melbourne )
S(- melbourne ) --> i want to fly to City(- melbourne )

Note that the signatures on these rules have not been generalised. Both rules have the common prefix "i want to fly", and both rules share the common values "city=melbourne". Therefore during the alignment phase, a rule is created as follows:

$X_{65}$(-melbourne)-->to City(-melbourne)

Notice that, although the attribute city=melbourne is common to all sentences with the prefix "i want to fly", if this attribute were removed from the signature the rewrite rule would not be well formed. The non-terminal $X_{65}$ is a randomly assigned unique non-terminal name. After generalisation, this rule becomes:

$X_{65}$(-?city)-->to City(-?city).

Substitution Phase

In contrast, to the first preferred embodiment, in the second preferred embodiment, rules of the form "A(x)-->B(X)" can exist when A is a non-terminal. To accommodate this, a rule can never be reduced using these rules, and when a constituent is being parsed, these rules can only be used when the left-hand side of the constituent is A. In addition, if more than one start symbol exists in the grammar, then a start symbol cannot be merged with any other non-terminal. In all other respects, the substitution phases in the two embodiment #2 is the same.

Merging Phase

In the second preferred embodiment, if more than one start symbol exists in the grammar, then a start symbol cannot be merged with any other non-terminal. In all other respects, the merging phase in the two preferred embodiments is the same.

Unchunking Phase

The unchunking phase in the two preferred embodiments is the same.

Final Phase

In the second preferred embodiment, just prior to the deletion of unreachable rules, all of the fixed rules are added to the hypothesis grammar. In all other respects, the final phase in the two preferred embodiments is the same.

Unfolding

Some context-free grammars have a property referred to as recursion that means that there is no upper bound to the length of sentences that can be generated by them. Recursion comes in three types: left, right, and centre recursion. Left recursion exists when there is a non-terminal X that can be expanded to a sentential form that begins with X i.e. $X \Rightarrow *X Y$. Similarly, right recursion exists when there is a non-terminal that can be expanded to a sentential form that ends with X i.e. $X \Rightarrow Y X$, and centre recursion is similarly defined as the case where $X \Rightarrow *|A \times B$. Direct recursion exists when there is a rule of the form $X(w) \rightarrow A X(z) B$ (Note that $|A|$ and $|B|$ can=0). Indirect recursion exists when $X(w) \Rightarrow *C X(z) D$, but there is no rule of the form "$X(w) \rightarrow A X(z) B$". For instance the following grammar has indirect left recursion on X and Y.

```
S --> p X
S --> j Y
X --> u Y g
X --> x
Y --> q X m
Y --> y
```

When left or right recursion exists in a grammar, there is some sequence of symbols that can be repeated zero or more times, with no upper bound on the number of times that the sequence can be repeated. It is possible to write context-free grammars that allow for a sequence to be repeated a specific number of times where there is minimum and a maximum number of times that the sequence can be repeated. Such grammars however cannot be learnt exactly using the merging process described herein. In particular, optional phrases such as the optional word "please" that may appear at the ends of sentences will be modelled in left-aligned grammars as a sequence that can be repeated zero or more times. For instance, if the merging process is presented with the sentences "give me cake" and "give me cake please" a grammar will be generated that generates sentences such as "give me cake please please" and "give me cake please please please please". In many instances, there is no real downside to this overgeneralisation. For instance, when the dialog system being developed using the merging process is text based the fact that the grammar can attach meanings to phrases that will not be entered has little impact on the performance of the developed application. However, when the dialog system uses speech recognition, restricting the language that can be spoken typically increases the speech recognition performance. For example, if the grammar allows the user to say any sequence of numbers at a particular point in the dialog, when these numbers represent a credit card number, a grammar that accepts only 16-digit strings is preferable to one that allows digit strings of any length.

This is the main reason why the unfolding process 210 is included in preferred embodiments of the grammatical inference system. Another reason is that some speech recognition systems will not accept grammars that contain recursion. The unfolding process 210 is shown in pseudo-code in Code Listing 14.

Figure 9:
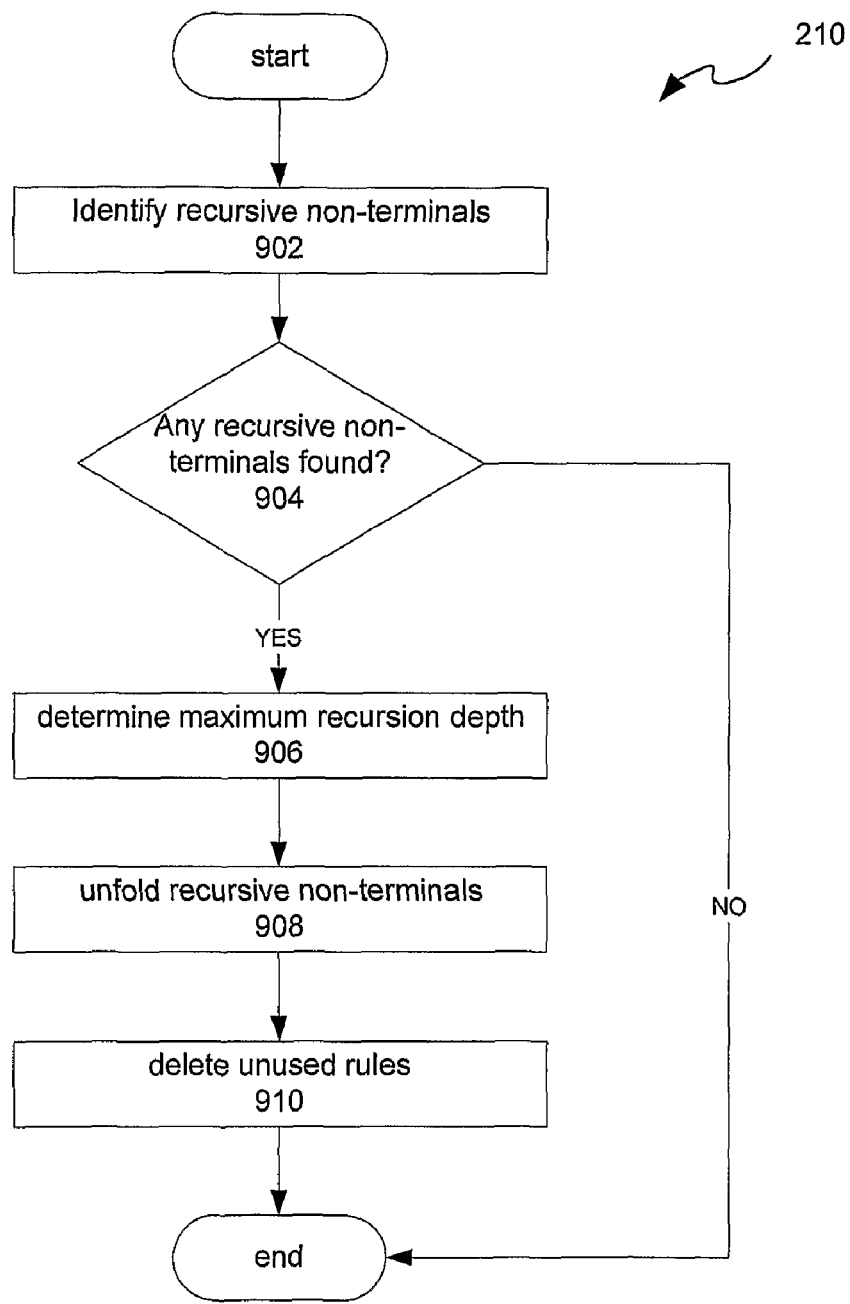
FIG. 9 is a flow diagram of an unfolding process executed by the grammatical inference systems of the first and second embodiments.

As shown in FIG. 9, the unfolding process 210 performs the following tasks:
(i) At step 902, it identifies recursive non-terminals using the function calc_recursive shown in code listing 16;
(ii) At step 906, it identifies the maximum number of times that the given non-terminal is used recursively in the positive examples using the function set_counts;
(iii) At step 908, it then removes recursion in grammar by unfolding recursive non-terminals using the function unfold so that it still generates the positive examples but some phrases that previously could be generated by the grammar no longer can be generated by the grammar; and
(iv) At step 910, it then optionally removes rules that are not use to generate any positive examples.

It should be noted that when the unfolding process 210 is used in conjunction with the merging process 202 or 802, the combined process can no longer learn grammars that can generate infinitely large languages. It can however learn a finite approximation to them. Over the lifetime of an interactive system that is being developed using the grammatical inference process, the set of sentences that the application needs to recognise is finite; therefore the unfolding process is considered to be advantageous, but can be optionally omitted if desired.

Firstly, non-terminals that are recursively defined in the grammar 208 are identified. This is performed by the function calc_recursive and reachable_nterms shown in Code Listing 16. This function reachable_nterms is called from each non-terminal N in the grammar. This function calculates all of the non-terminals that are reachable from the given non-terminal. If $N \in$ reachable_nterms(N), then by definition N is recursive.

Next, the maximum and minimum number of times that a non-terminal is recursively called is determined by the set_counts function shown in Code Listing 17. This function parses all of the sentences and then examines each derivation tree one node at a time using the function inc_counts shown in code listing 18.

Then, each recursive non-terminal is unfolded N+2 times, where N is the maximum depth of recursion observed in the training examples on any non-terminal This is done using the function unfold described in Code listing 19. This function requires all recursive non-terminals to be enumerated. The function order_nterms described in code listing 20 performs this task. The principle of the function unfold is that is for all rules of the form
"$W(x) \rightarrow \Omega_1 \Omega_1 \Omega_N$" if for all $\Omega_1$ such that root($\Omega_I$) is a non-terminal and order(root($\Omega_I$))>order(W), then the grammar is not recursive.

To achieve this, the function unfold performs the following. For any rule of the form "$W(x) \rightarrow \Omega_1 \Omega_1 \Omega_N$" where N is and recursive non-terminals are to be unfolded N times, then the rule is replaced by N rules of the form {nterm[W,0]→B', nterm[W,1]→B' ... nterm[W,N]→B'}. In addition, for any recursive nonterminal Y in B, Y is replaced by nterm[Y, count+1] when the left hand side of and the copied rule is nterm[W,count]. This ensures that the resulting grammar is not recursive and that all recursive rules are expanded to depth N.

For instance, in the example:

```
%slots {
}
S --> B A
A --> heard B
A --> saw B
B --> the C
B --> a C
B --> B that A
C --> cat
C --> dog
C --> mouse
``` the non-terminals can be enumerated as follows:

```
S = 0
A = 1
B = 2
C = 3
```

Note that only the non-terminals A & B are recursive, both them indirectly. If all recursive non-terminals are to be expanded to a depth of 4, then the array nterm is populated. If this table was populated as follows:

```
(A,0,) = A
(A,1,) = X32
(A,2,) = X33
(A,3,) = X34
(A,4,) = X35
(B,0,) = B
(B,1,) = X36
(B,2,) = X37
(B,3,) = X38
(B,4,) = X39
``` then when the rule "B-->B that A" is examined, the following rules are created
"B-->X36 that X32", "X36-->X37 that X33", "X37-->X38 that X34" and the rule "B-->B that A" is deleted. Similarly, when the rule "A-->heard B" is examined the following rules would be created.
"A-->heard B", "X32 heard X36", "X33 heard X37", "X34 heard X38" and the rule "A heard B" would be deleted.

At the completion of the function unfold, the grammar would be as follows:

```
%slots {
}
S --> B A
C --> cat
C --> dog
C --> mouse
A --> heard B
X32 --> heard X36
X33 --> heard X37
X34 --> heard X38
A --> saw B
X32 --> saw X36
X33 --> saw X37
X34 --> saw X38
```

```
B --> the C
X36 --> the C
X37 --> the C
X38 --> the C
B --> a C
X36 --> a C
X37 --> a C
X38 --> a C
B --> X36 that X32
X36 --> X37 that X33
X37 --> X38 that X34
```

At this point, the grammar has no recursion and can parse all of the positive examples. At this point, the unfolding process 210 can optionally remove unused rules by parsing the positive examples using a chart parser, and rules that are not labelled as fixed and were not used to parse any training sentences are deleted. This is shown in code listing 15 as a call to the function reestimate. Whether or not this rule deletion occurs depends upon the options that were passed to the unfolding process by the developer from the command line, or by selecting options in a configuration file, or by checking a check box in a popup window.

Splitting Process

Although the merging processes 202 and 802 can learn a class of context-free grammar exactly from positive examples only, sometimes the grammar that is learnt generates some phrases that the developer does not like. As stated before, this is often not a concern when the grammars are being used to parse text-input or are to be used in conjunction with a speech recogniser. When the grammars are being used to generate prompts, it is often important for successful operation of the interactive system that some sentences cannot be generated by the grammar. To accommodate this, the splitting process 214 takes as its input a starting grammar 212 and a set of positive and negative examples 206, 222. At its completion, the splitting process 214 either returns an error or returns a grammar 216 that can generate all of the positive examples 206 and none of the negative examples 222.

Although the splitting process 214 can be used in combination with the merging processes 202, 702 and the unfolding process 210, as described above, the splitting process 214 is a useful debugging tool that can be used in a stand-alone manner. For instance, it can be used to remove phrases from grammars that have been hand-coded. This is particularly advantageous when the hand-coded grammars are large and complex.

The working principle of splitting process 214 is to iteratively unfold non-terminals, parse the positive and negative sentences using the grammar, and delete bad rules. Non-terminals to be unfolded are identified using a prefix tree acceptor. Specifically, the process 214 identifies a prefix that is common to only negative sentences. Using this prefix and a negative sentence that contains this prefix and is parseable by the grammar, a non-terminal is identified to be unfolded.

The technique for unfolding non-terminals differs in the splitting process 214 from the technique for unfolding non-terminals in the unfolding process 210. In the unfolding process 210, the purpose of unfolding a non-terminal is to remove recursion. In the splitting process 214, the function that splits a non-terminal (unfold_single_reference) takes as its arguments a grammar, a non-terminal, and a rule that contains that non-terminal on its right hand side and an integer referring to the instance of the non-terminal on the right hand side of the rule.

The splitting process 214 operates as follows. The main loop of the splitting process 214 is shown in pseudo-code in Code Listing 21 as the function remove_bad_examples. The splitting process 214 first loads in the grammar 212 and positive and negative examples 206, 222. Then the function remove_bad_examples is called. This function calls the function check_consistency. This function returns true if the training data is inconsistent, which will cause the process to terminate. The behaviour of this function is as follows.

If any sentence appears in both the set of positive examples 206 and the set of negative examples 222 with the same attributes, an error is flagged which causes the process to terminate. If a sentence appears in both the set of positive examples 206 and the set of negative examples 222 with different attributes, the process continues. For instance, it is acceptable to have the sentence "from melbourne {from=melbourne}" in the set of positive examples 206 and the sentence "from melbourne {to =melbourne}" in the set of negative examples 222.

The positive examples 206 are parsed using a chart parser and the starting grammar 212. If one sentence from the set of positive examples 206 cannot be parsed, or can be parsed but returns a different set of attributes to that listed in the set of positive examples 206, then an error is flagged and the process ends. It should be noted that when the splitting process 214 is provided with a grammar generated by either of the merging processes 202, 802 from the positive examples 206, all sentences in the set of positive examples 206 will be parseable using the grammar.

Next, all of the negative examples are parsed using the grammar and a chart parser. If there is a sentence in the set of negative examples 222 that cannot be parsed using the grammar, or can be parsed using the grammar but is assigned a different set of attributes, then it is deleted from the local copy of the set of negative examples, but is not removed from the file (or similar medium) from which the training examples were obtained.

At this point, the process has a set of training sentences that are to be removed from the grammar, together with a set of sentences that are required to be generated from the grammar.

The function parse_and_delete_rules is then called. The behaviour of this function is as follows. Both the positive and negative examples are parsed using a chart parser. For each rule in the grammar:

(i) If the rule is used to parse at least one positive sentence it is not deleted.
(ii) If the rule is not used to parse any positive sentences and is used to parse at least negative sentence it is deleted.
(iii) If the rule is not used to parse any positive sentences or any negative sentences and is marked as a fixed rule it is not deleted.
(iv) If the rule is not used to parse any positive sentences or any negative sentences and is not marked as a fixed rule it is deleted.

If at least one rule has been deleted, the positive and negative examples 206, 222 are parsed using the grammar. All negative sentences that can no longer be parsed using the grammar are then deleted from the set of negative examples. If the grammar can no longer parse any of the negative examples the function returns true, which causes the function remove_bad_examples to successfully complete. If the set of negative examples is not empty then the function returns false, which causes the function remove_bad_examples to continue.

Next, a prefix tree acceptor is created using both the positive and negative sentences. This prefix is created using the function add_to split_pta which is identical to the function add_to_pta described earlier in this document with the exception that each node in the prefix tree acceptor includes two Boolean members. The first Boolean member denotes whether the prefix described by that node is a prefix of at least one positive sentence. The second Boolean denotes whether the prefix described by that node is a prefix of at least one negative sentence. Like the prefix tree acceptor used for the merging process, the prefix tree acceptor includes a separate node to denote the end of sentence.

Next, the negative examples are iterated through one at a time. Using the prefix tree acceptor, the shortest prefix of this negative example is found such that there is no positive example that begins with that prefix. Rather than returning the actual prefix, the function returns an integer specifying the length of the prefix. The negative example is then parsed using a chart parser using the function all_parses_using_chart_parser. There can be more than one parse tree that can generate this sentence, and therefore a list of parse trees is returned from the function all_parses_using_chart_parser. This function returns only those derivation trees that generate the same set of attributes as the attributes of the negative example.

The function recursive_nterms is then called to determine if there are any non-terminals in any derivation trees that are recursive. If this is the case, then the function recursive_n-terms returns the list of these non-terminals, and the function remove_recursion is called to remove recursion on these non-terminals using the same method as the unfolding process described above. Once this is done, the function all_parses_using_chart_parser is called to update the set of derivation trees for this sentence. If the sentence cannot be parsed using the grammar in a way that generates the attributes of the grammar, the next negative example is investigated.

Then, for each derivation tree that can generate the negative example, the function get_active_rules is called. This function constructs from the derivation tree an ordered list of dotted rules of the form "X(w)-->A.B" where the derivation tree of the sentence being parsed is $S(z) \Rightarrow^* C\ X(w)\ d \Rightarrow C\ A\ B\ d \Rightarrow^* C\ A\ b \Rightarrow^* c\ a\ b\ d$ where c a b d is the negative example described by the derivation tree with attributes w.

The dotted rule "X(w)-->A.B" denotes that if the prefix c a is parsed left to right, then at that point in the parsing the rule "X-->A B" is a candidate rule for reducing the sequence C A B d to C X(w) d after the sequence b is reduced to become B. The dotted rule notation is the same as that used in a chart parser. The important distinction between a dotted rule on a chart parser and a dotted rule returned by this function is that in this case it is known that the rule will be used.

As shown in Code Listing 22, the function get_active_rules investigates a derivation tree top down left to right, in a fashion similar to a left-most expansion. As it observes nodes in the derivation tree, it pushes a dotted rule onto the stack active_edges so that the dotted rules that are active at any point can be retrieved. The function pops the active edge of the stack before it investigates the next node of the derivation tree.

The function uses the variable iptr to keep track of the number of terminals observed, and when iptr is equal to the number of symbols in the prefix, the function returns the dotted rules on the stack at that point.

The function get_active_rules returns the rules in an ordered list. It can be shown that if the sentence was being parsed bottom up left to right, then the rule at the top of the list returned by the function get_active_rules is next rule that would be used to reduce the sequence, while the second rule will be used after that. This list provides a list of candidate rules to be unfolded, such that if they are unfolded then the negative example will not be parseable using the grammar.

Specifically, the function remove_bad_examples iterates through the list returned by the function get_active_rules and finds the first dotted rule of the form X(w)-->A.B where the non-terminal X appears on the right hand side or more than one rule. In this case, the dotted rule below this rule in the list will be of the form Y(y)-->E.X(v) F. The non-terminal X is then unfolded as follows:
(i) A new non-terminal name W is created.
(ii) For all rules of the form X(u)-->U a rule of the form W(u)-->U is created.
(iii) The rule Y(y)-->E X(v) F is replaced by the rule Y(y)-->E W(v) F.

Note that, at this point it is known that X is not a recursively defined non-terminal. The function parse_and_delete_rules is then called again to delete bad rules. The loop is then repeated until the given negative example cannot be parsed by the grammar. At the completion of the function the splitting process returns the grammar that has been inferred.

Although embodiments of the grammatical inference processes are described above with reference to the English language, it will be apparent that the grammatical inference processes described herein can also be applied to the automated development of interactive systems in languages other than English. It should be noted that the grammatical inference processes can identify a class of context-free grammar in the limit by reducing the right hand sides of all rules using a typed leftmost reduction. It can be shown that the same effect can be achieved by reducing the right hand sides of all rules to a typed rightmost reduction, although the class of grammar that can be learnt is different one. A typed rightmost reduction can be achieved by reducing sequences right to left rather than left to right. Similarly, it can be shown that a class of grammar can be identified in the limit from positive examples by identifying constituents via alignment of sentences with common suffixes.

In addition, although the embodiments described above can infer both the meaning and syntax of sentences by constructing a unification grammar, it will be apparent to those skilled in the art that the process can be simplified via the removal of those steps that generate signatures where the requirement is to learn a grammar that is a context-free grammar rather than a context-free unification grammar.

These and many other modifications will be apparent to those skilled in the art without departing from the scope of the present invention as herein described.

The invention claimed is:

1. A non-transitory computer-readable non-volatile storage medium having stored thereon computer-executable instructions that, when executed by one or more processors of a computer system, cause the computer system to perform a process for inferring a grammar from a plurality of example sentences, the process including:
   selecting ones of said example sentences having a common suffix or prefix component;
   identifying the other of said suffix or prefix component of each selected sentence;
   generating rules for generating the example sentences and the other components of the selected sentences, each of the rules having a left-hand side and a right-hand side;
   reducing the right hand side of each rule on the basis of the right hand sides of the other rules using typed leftmost reduction or typed rightmost reduction;
   identifying one or more shortest prefix components common only to negative example sentences of said plurality of example sentences;
   generating rules for generating said one or more shortest prefix components;
   removing one or more of said one or more shortest prefix components by removing one or more of said rules; and
   generating a grammar on the basis of the reduced rules.

2. A computer-readable non-volatile storage medium as claimed in claim 1, wherein the process includes deleting rules that violate the constraints of a target class for said grammar.

3. A computer-readable non-volatile storage medium as claimed in claim 2, wherein said deleting includes removing one or more of left recursion, unreachable rules and badly formed signatures.

4. A computer-readable non-volatile storage medium as claimed in claim 1, wherein said reducing includes resolving conflicts from left to right.

5. A computer-readable non-volatile storage medium as claimed in claim 1, wherein said reducing includes resolving conflicts from right to left.

6. A computer-readable non-volatile storage medium as claimed in claim 1, wherein said reducing is repeated until no more reductions can be made, subject to one or more constraints of the grammar.

7. A computer-readable non-volatile storage medium as claimed in claim 1, wherein the process includes selecting from said rules one or more rules to be unfolded on the basis of said one or more shortest prefix components; and wherein said step of removing includes unfolding one of more of the selected rules.

8. A computer-readable non-volatile storage medium as claimed in claim 1, wherein said reducing corresponds to one of typed leftmost reduction and typed rightmost reduction.

9. A computer-readable non-volatile storage medium as claimed in claim 1, wherein the example sentences include a plurality of positive and negative example sentences, including:
   generating in the limit a class of grammar from only the positive example sentences; and
   removing recursion from the grammar.

10. A computer-readable non-volatile storage medium as claimed in claim 9, wherein said step of removing recursion includes removing from the grammar rules that generate negative example sentences.

11. A computer-readable non-volatile storage medium as claimed in claim 1, wherein said step of reducing includes resolving conflicts from left to right or from right to left.

12. A computer-readable non-volatile storage medium as claimed in claim 11, wherein said step of reducing is repeated until no more reductions can be made, subject to one or more constraints of the grammar.

13. A computer-readable non-volatile storage medium as claimed in claim 1, wherein the example sentences include positive and negative example sentences, and the process includes:
   identifying in the limit a grammar from only the positive example sentences using machine learning; and
   wherein said generating includes generating, on the basis of said grammar and said plurality of positive and negative example sentences, an output grammar that can generate all of the positive example sentences but cannot generate any of the negative example sentences.

14. A non-transitory computer-readable non-volatile storage medium having stored thereon computer-executable instructions that, when executed by one or more processors of a computer system, cause the computer system to perform a process for inferring a grammar from a plurality of positive and negative example sentences and a starting grammar, the process including:
- identifying one or more shortest prefix components common only to said plurality of negative example sentences;
- identifying rules of the starting grammar for generating said one or more shortest prefix components;
- removing one or more of said one or more shortest prefix components by removing one or more of said rules; and
- generating a grammar on the basis of the remaining rules.

15. A computer-readable non-volatile storage medium as claimed in claim 14, wherein the process includes:
- selecting from said rules one or more rules to be unfolded on the basis of said one or more shortest prefix components; and
- wherein said removing includes unfolding one of more of the selected rules.

16. A computer-readable non-volatile storage medium as claimed in claim 14, wherein the example sentences include positive and negative example sentences, and the process includes: identifying in the limit a grammar from only the positive example sentences using machine learning; and generating, on the basis of said grammar and said plurality of positive and negative example sentences, an output grammar that can generate all of the positive example sentences but cannot generate any of the negative example sentences.

17. A computer-readable non-volatile storage medium as claimed in claim 14, wherein the process includes:
- identifying one or more shortest prefix components common only to negative example sentences of said plurality of example sentences;
- generating rules for generating said one or more shortest prefix components; and
- removing one or more of said one or more shortest prefix components by removing one or more of said rules.

18. A grammatical inference system, including a memory storing sentences having suffix and prefix components and at least one processor programmed to perform a process for inferring a grammar from a plurality of positive and negative example sentences and a starting grammar, the process including:
- selecting ones of said stored sentences having a common suffix or prefix component;
- identifying the other of said suffix or prefix component of each selected sentence;
- generating rules for generating the example sentences and the other components of the selected sentences, each of the rules having a left-hand side and right-hand side;
- reducing the right hand side of each rule on the basis of the right hand sides of the other rules using typed leftmost reduction or typed rightmost reduction;
- identifying one or more shortest prefix components common only to negative example sentences of said plurality of example sentences;
- generating rules for generating said one or more shortest prefix components;
- removing one or more of said one or more shortest prefix components by removing one or more of said rules; and
- generating a grammar on the basis of the reduced rules.

19. A grammatical inference system as claimed in claim 18, wherein the processor is further programmed to generate, on the basis of said grammar and said plurality of positive and negative example sentences, an output grammar that can generate all of the positive example sentences but cannot generate any of the negative example sentences.

20. A grammatical inference system as claimed in claim 18, wherein the processor is further programmed to remove recursion from said grammar.

21. A grammatical inference system as claimed in claim 18, wherein the processor is further programmed to convert said grammar to a format for use in a dialog system.

22. A grammatical inference system as claimed in claim 21, wherein said format includes an SRGS grammar.

23. A grammatical inference system as claimed in claim 21, wherein said format includes program code.

* * * * *